US006091930A

United States Patent [19]
Mortimer et al.

[11] Patent Number: 6,091,930
[45] Date of Patent: Jul. 18, 2000

[54] CUSTOMIZABLE INTERACTIVE TEXTBOOK

[75] Inventors: J. Thomas Mortimer, Chagrin Falls; Michael E. Miller, Cleveland Hts., both of Ohio

[73] Assignee: Case Western Reserve University, Cleveland, Ohio

[21] Appl. No.: 08/811,604

[22] Filed: Mar. 4, 1997

Related U.S. Application Data

[60] Provisional application No. 60/012,733, Mar. 4, 1996.

[51] Int. Cl.[7] .......... G09B 7/00

[52] U.S. Cl. .......... 434/362; 434/118; 434/350; 706/927

[58] Field of Search .......... 434/118, 322, 434/362, 365, 350, 307 R, 236, 258, 169, 323; 707/512, 501; 706/924, 927

[56] References Cited

U.S. PATENT DOCUMENTS

| | | | |
|---|---|---|---|
| Re. 36,028 | 1/1999 | Deesen et al. | 434/327 |
| 4,622,013 | 11/1986 | Cerchio . | |
| 4,752,889 | 6/1988 | Rappaport et al. | 364/513 |
| 4,820,167 | 4/1989 | Nobles et al. | 434/336 |
| 4,839,822 | 6/1989 | Dormond et al. . | |
| 4,905,163 | 2/1990 | Garber et al. . | |
| 4,945,476 | 7/1990 | Bodick et al. . | |
| 5,146,552 | 9/1992 | Cassorla et al. | 395/145 |
| 5,173,051 | 12/1992 | May et al. | 434/118 |
| 5,259,766 | 11/1993 | Sack et al. . | |
| 5,333,237 | 7/1994 | Stefanopoulos et al. | 395/12 |
| 5,367,621 | 11/1994 | Cohen et al. | 395/154 |
| 5,372,507 | 12/1994 | Goleh . | |
| 5,454,722 | 10/1995 | Holland et al. . | |
| 5,524,193 | 6/1996 | Covington et al. | 395/154 |
| 5,616,033 | 4/1997 | Kerwin | 434/118 |
| 5,681,170 | 10/1997 | Rieber et al. | 434/355 |
| 5,760,771 | 6/1998 | Blonder et al. | 345/336 |
| 5,779,486 | 7/1998 | Ho et al. | 434/353 |
| 5,788,508 | 8/1998 | Lee et al. | 434/350 |
| 5,806,079 | 9/1998 | Rivette et al. | 707/512 |
| 5,813,865 | 9/1998 | Greenbowe et al. | 434/276 |
| 5,823,781 | 10/1998 | Hitchcock et al. | 434/118 |
| 5,823,788 | 10/1998 | Lemelson et al. | 434/350 |
| 5,838,313 | 11/1998 | Hou et al. | 345/302 |
| 5,845,301 | 12/1998 | Rivette et al. | 707/512 |
| 5,863,208 | 1/1999 | Ho et al. | 434/362 |

*Primary Examiner*—Joe H. Cheng
*Attorney, Agent, or Firm*—Fay, Sharpe, Fagan, Minnich & McKee

[57] ABSTRACT

A customizable interactive educational system 30 includes an assembly of data modules 60 which control the inputting, categorizing, and formatting of educational data which have been determined to be well-accepted principles. The well-accepted principles create a primary knowledge base stored as a professor customizable interactive textbook (CITbook) 40. The primary knowledge base is organized by at least subject matter, topic, and knowledge level and the data are linked to each other in predetermined sequences. Data managers 200 allow a professor teaching a course to select and manipulate portions of the primary knowledge base of the professor CITbook 40 to generate a customized student version 50 in accordance with the course being taught and personal data added by the professor. The data added or altered by the professor is visually distinguished from the well-accepted data. Maps are generated which include link sequences connecting the selected subjects and topics in a primary sequence based on the course being taught. Secondary links are generated interconnecting the selected subjects and topics in multiple directions allowing the student to access reference data by selecting one of the secondary links. A presentation manager 250 executes the primary sequence and presents the selected subjects and topics contained in the primary sequence to the student. The secondary links allow the student to dynamically change the primary sequence thereby accessing background or advanced topics.

18 Claims, 20 Drawing Sheets

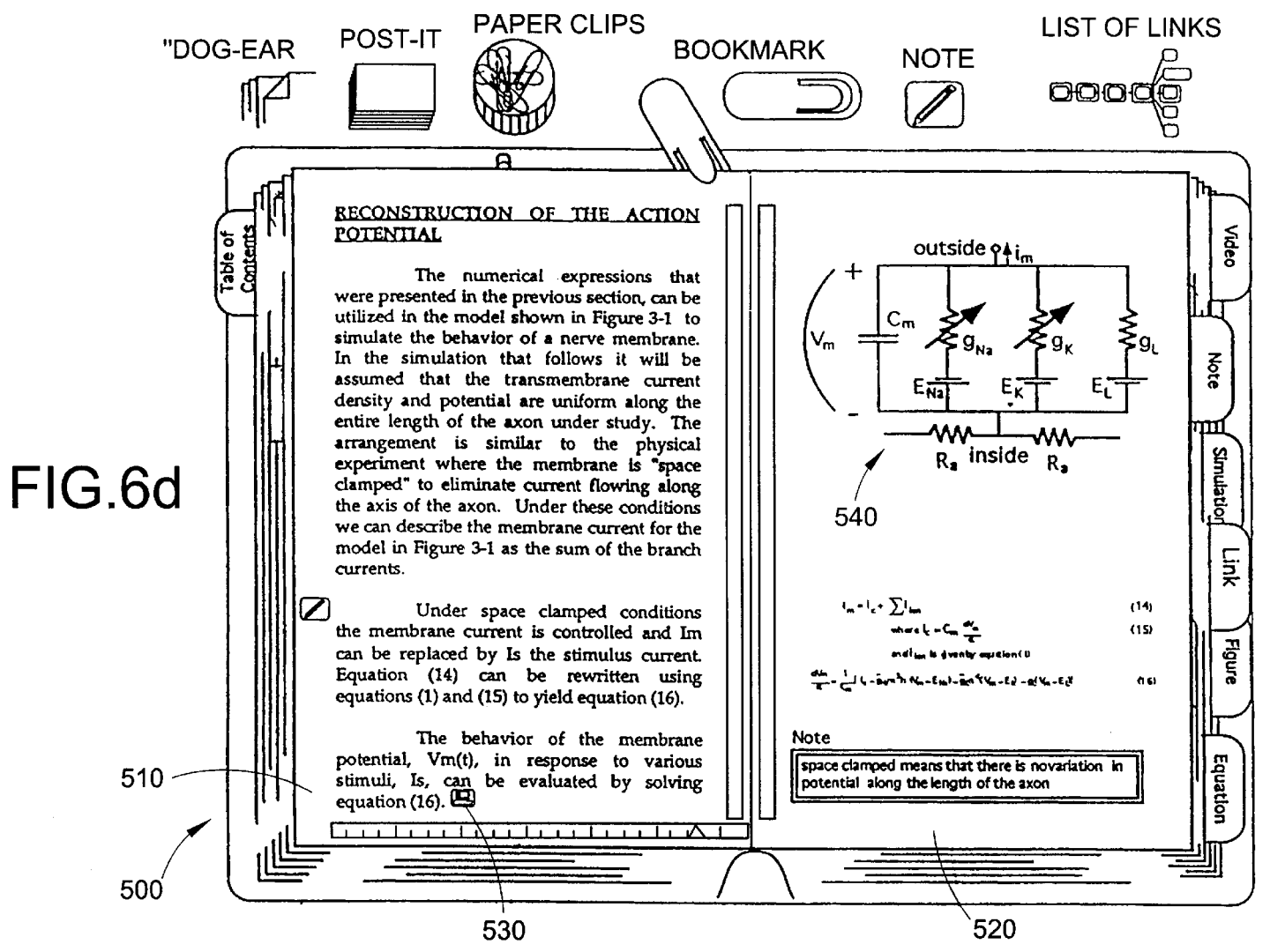

"DOG-EAR
POST-IT
PAPER CLIPS
BOOKMARK
NOTE
LIST OF LINKS

Table of Contents

RECONSTRUCTION OF THE ACTION POTENTIAL

The numerical expressions that were presented in the previous section, can be utilized in the model shown in Figure 3-1 to simulate the behavior of a nerve membrane. In the simulation that follows it will be assumed that the transmembrane current density and potential are uniform along the entire length of the axon under study. The arrangement is similar to the physical experiment where the membrane is "space clamped" to eliminate current flowing along the axis of the axon. Under these conditions we can describe the membrane current for the model in Figure 3-1 as the sum of the branch currents.

Under space clamped conditions the membrane current is controlled and Im can be replaced by Is the stimulus current. Equation (14) can be rewritten using equations (1) and (15) to yield equation (16).

The behavior of the membrane potential, Vm(t), in response to various stimuli, Is, can be evaluated by solving equation (16).

outside $i_m$
+
−
$V_m$
$C_m$
$g_{Na}$
$g_K$
$g_L$
$E_{Na}$
$E_K$
$E_L$
$R_a$ inside $R_a$

(14)
(15)
(16)

Note
space clamped means that there is novariation in potential along the length of the axon Video
Note
Simulation
Link
Figure
Equation 540
510
500
530
520

FIG.6d

CUSTOMIZABLE INTERACTIVE TEXTBOOK

CROSS-REFERENCE TO RELATED APPLICATION

This application claims priority from U.S. provisional application Ser. No. 60/012,733 filed Mar. 4, 1996.

BACKGROUND

The present invention is directed to the art of educational systems. It finds particular application in conjunction with interactive systems which control and facilitate the comprehension of a subject to a student user in dynamically changeable sequences, dynamically changeable knowledge levels, and dynamically customizable authoring of subjects to ensure an up-to-date status of material and will be described with particular reference thereto. It is to be appreciated, however, that the invention will also find application in other educational area in which information is to be presented to a student for comprehension and includes interconnection with directly or indirectly related subject matter.

A classroom typically includes a professor, a number of students and a selected textbook containing information that the students are attempting to learn. The professor verbally presents the information to the students in a lecture and uses visual aids such as a blackboard or projector when needed. The lecture is typically limited to a one or two hour time period thus requiring the professor to proceed at a continuous pace in order to cover the subject matter for the day.

Students experience a number of problems with the lecture-based form of education. For example, while trying to write down notes, the student fails to hear what is currently being said by the professor and consequently fails to make notes on the material which was not heard. The student may also fail to see a visual aid which is displayed but quickly removed. Information is missed due to the pace of the class and students are not given sufficient time for copying and personalizing notes as desired. The pace of the class also reduces the time students have to ponder and absorb what is being discussed and prohibits students from enhancing their notes by adding more information about their own understanding of what is being discussed. Overall, comprehension of the discussion is often far less than optimal.

Another problem exists in most lecture-based classrooms, namely each student has a different level of understanding based on past course work or experiences. Due to the limited time period of a lecture, a professor conducts the discussion at a fairly consistent pace. It is difficult, if not impossible, to accommodate each student's understanding of the discussed topic. For those students who understand the topic, the lecture pace is too slow causing a loss of interest. For those students who do not understand, the lecture pace is too fast causing confusion and eventually frustration. The selected textbook offers no solution for these students because it is written for one narrow range of knowledge. A different textbook must be found and consulted in order for a student to obtain background or elementary information for a selected topic. Likewise, a different textbook must be found and consulted if advanced information is desired. An alternative solution includes having the professor modify the lecture to include elementary or advanced topics to accommodate a particular group of students. However in doing so, the professor effectively amplifies the problems for the other student group.

The problem of students requiring access to a wide variety of knowledge levels for course work is especially apparent in the field of biomedical engineering. Educating biomedical engineering students presents a unique challenge to educators because these students are required to assimilate, interconnect and apply knowledge from many diverse disciplines. For example, knowledge requirements for biomedical engineers working on neural prostheses include electronics, electromagnetic fields, mechanics, materials science, neuroscience, electrochemistry, organ physiology and pathology. A similar list of subjects could be generated for tissue engineering, biomaterials, biomedical imaging and other biomedical engineering specialties. Unfortunately, very few students undertake this study with an adequate level of mastery in each subject area, and certainly, professionals trained in other disciplines will not be uniformly knowledgeable in all of these areas. Furthermore, the incorporation of all these fields mandates that information be drawn from experts in many areas and that advances in each field are continuously updated and distributed.

Another problem with educational environments which rely on printed materials as a source of information is that the printed materials become out-of-date even by the time they are published. Current discoveries are thus not readily available. Additionally, the printed material is permanent and cannot be modified or updated by a reader.

The present invention contemplates a new and improved customizable interactive textbook which overcomes the above-referenced problems and others.

SUMMARY OF THE INVENTION

In accordance with the present invention, an educational system for teaching a subject includes a primary knowledge base consisting well-accepted data relating to the subject. A secondary knowledge base is generated based on selected portions of the well-accepted data of the primary knowledge base. The secondary knowledge base is customized by the educator by combining personal data which are not well-accepted in the subject with the well-accepted data. The personal data are distinguished from the well-accepted data. The customized secondary knowledge base is presented in a predetermined sequence and the personal data are visually distinguished from the well-accepted data such that each type of data are identifiable by a student.

In accordance with another aspect of the present invention, an interactive teaching system for educating a student is provided. The teaching system includes a processor and a memory unit which organize and present to the student a plurality of subjects. A contribution means allows for inputting and modifying of input data into the interactive teaching system where the input data corresponds to one of the plurality of subjects. A data manager categorizes the input data into a selected subject of the plurality of subjects and determines a knowledge level from a plurality of knowledge levels of the selected subject comprising one of elementary level, high school level, college level, graduate level, and expert level. The data manager organizes the categorized data into a plurality of chapters and connects each chapter in a selected sequence based on the knowledge level of the selected subject. An interaction means receives data from the student and allows the student to select a subject from the plurality of subjects. A presentation means presents the selected subject to the student in a predetermined sequence. A subject connector means selectively connects the selected subject at a plurality of first connector points along the predetermined sequence to at least one different subject at a plurality of second connector points. The plurality of first connector points are presented to the student by the presentation means such that when one of the plurality of first connector points is selected by the student, the subject connector means interrupts the execution of the predetermined sequence. The presentation means then presents the different subject beginning at the second connector point which is connected to the selected one of the plurality of first connector points. A level connector means selectively connects the selected subject to a different knowledge level from the plurality of knowledge levels. The level connector means generates a level connector point along the predetermined sequence and connects the level connector point to a destination level connector point within the different knowledge level. The level connector point is selectable by the user through the presentation means such that when the level connector point is selected by the user, the level connector means interrupts the predetermined sequence and the presentation means presents the selected subject at the different knowledge level connected to the destination level connector point.

In accordance with another aspect of the present invention, a method of teaching a subject matter to a student is provided. A primary database is generated which includes a plurality of subjects each having a knowledge level from a plurality of knowledge levels. The plurality of knowledge levels include elementary level, high school level, college level, graduate level and expert level. Each subject includes a plurality of topics formed from multimedia data including text, audio, video, illustration, simulation and animation. A secondary database is generated which includes a first set of subjects and topics selected from the plurality of subjects and the plurality of topics from the general purpose database. A primary link sequence is defined connecting the first set of subjects and topics in accordance with an order of the subject matter. A plurality of secondary link sequences are defined connecting the first set of subjects and topics to each other where the plurality of secondary link sequences are different than the primary link sequence. The plurality of secondary link sequences being activatable by the student. The selected subjects and topics are presented to the student in a presentation sequence based on the primary link sequence while allowing the student to dynamically change the presentation sequence by activating a selected one of the plurality of secondary link sequences.

One advantage of the present invention is that it provides a knowledge base of well-accepted topics that can be customized by an educator to accommodate interests and needs of an audience.

Another advantage of the present invention is that the multimedia presentation including auditory, visual and interactive involvement with the material being presented promotes assimilation rather than memorization of the material.

Another advantage of the present invention is that the presentation sequences are easily changeable to define customized sequences. Thus, offering educators an educational tool for easy assembly, modification and adaption of materials for their specific audience.

Another advantage of the present invention is that it provides an interdisciplinary data base covering biomedical engineering subjects ranging from an elementary knowledge level to expert knowledge level. By linking the knowledge levels together, the present invention equalizes the natural differences in backgrounds of students by providing instant access to background and advanced information.

Another advantage of the present invention is that a student can dynamically change the presentation sequence, dynamically change the knowledge level of the presented material, or dynamically change the subject matter altogether in accordance with the student's desire. In this manner, the present invention is accommodating to the knowledge level and motivation of the student.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 6*d* illustrates a graphical presentation generated by the present invention;

DETAILED DESCRIPTION OF THE PREFERRED EMBODIMENTS

Figure 1:
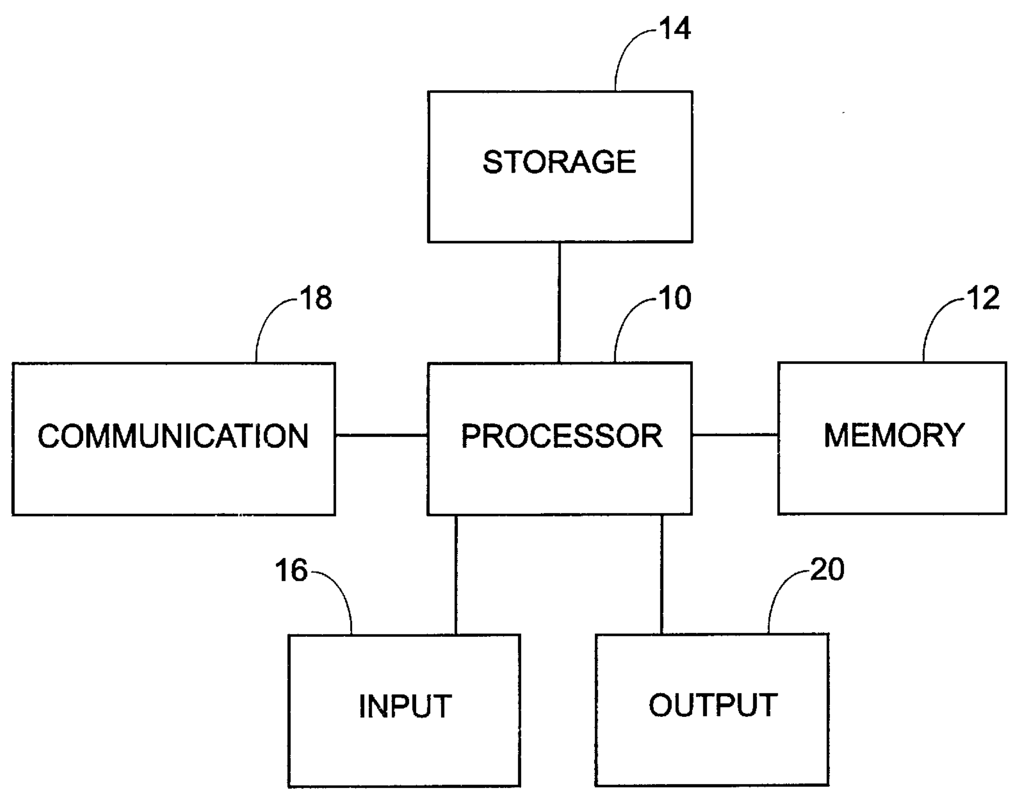
FIG. 1 is an illustration of a hardware configuration used by the present invention.

With reference to FIG. 1, a core configuration of the customizable interactive textbook (hereinafter "CITbook") is shown including a processor, a memory unit, a data storage unit, an input device such as a keyboard, mouse, and scanner, a communications unit for data communication with other systems, and an output device for outputting textual, graphical, video, and audio data. Of course, a plurality of these devices may be included in order to achieve a desired level of computing and processing power as is known in the art. Software routines for performing many of the functions described herein are preferably generated using an object-oriented language such as c++. Of course, any desired programming language or alternately a high-level programming package may be used.

An example of a core configuration includes a pentium 100 MHZ desktop computer system including cache memory, random access memory, a hard drive storage device, a multi-scan monitor, a 3.5 inch diskette drive, a sound card, keyboard, mouse, and a selected operating system. Of course, other configurations may be selected to improve processing power, storage capabilities, and presentation capabilities.

Generally describing the present invention, the CITbook supports all features of text found in traditional textbooks. The text explains and describes concepts as well as refers to information found in supporting graphs, tables and illustrations. Organization of the material includes equation and illustration numbers as well as appropriately headed chapters, sections within chapters, and subsections within sections. Different styles and sizes of fonts are provided for emphasis and ease of reading.

Text is initially generated by users with any word processor. That way, the users can work in an environment with which they are already comfortable while having access to popular font choices, character formatting, searching features, and spelling, thesaurus, and outlining tools. Those users who may be entering text into the interactive system include authors writing chapters for the CITbook, experts making modifications to the CITbook as they deem necessary or appropriate, or students who need to make their own notes for clarification or as a reminder in the "margins" of the CITbook. The interactive system formats the inputted text in a predetermined format, for example, including section headings/subheadings and equation numbers for inclusion in the CITbook as is described below.

The CITbook system, which for exemplary purposes, will be described as containing educational subject matter relating to *Bioelectric Engineering of the Nervous System*. Of course, the present invention is applicable for any type of subject matter. Generally speaking, the CITbook system includes three CITbook units. The units include: a general purpose CITbook 30 (referred to as "gpCITbook"), a professors' CITbook 40 (referred to as "pCITbook") and a students' CITbook 50 (referred to as "sCITbook"). The general purpose CITbook 30 includes a hardware and software structure for example shown by FIG. 2*a*. The general purpose CITbook 30 is void of subject matter material but includes software modules for generating a professor CITbook 40 which is the result of loading the general purpose CITbook 30 with Bioelectric Engineering of the Nervous System data or other subject matter. The professor CITbook 40 is then used, for example by a professor, to create a students' CITbook 50 which is custom designed for the professor's class. The student CITbook 50 is intended for classroom use in a course taught by the professor who created the student CITbook. Of course, any expert in the field of the subject matter contained in the professor CITbook 40 can generate, customize, distribute and use a student CITbook 50 for any lecture or seminar environment.

The general purpose CITbook 30 is a computer software environment which includes an assembly of data modules 60 composed of hardware components, software routines, and combinations of both. The data modules 60 are defined and configured to accept, format, organize and categorize selected educational subject matter media which generates a professor CITbook 40. As a foundation and for exemplary purposes, the initial educational subject matter comes from a graduate course at Case Western Reserve University identified as EBME 407 and entitled "Fundamentals of Applied Neural Control." One source used form this course is entitled "Neural Prostheses: Fundamental Studies" edited by William F. Agnew and Douglas B. McCreery which is incorporated herein by reference. Generally speaking, this course begins with basic aspects of electrically activating the nervous system and continues through the development of investigational devices as well as neural prostheses currently being used by patients. Subsequently, other material can be entered using the general purpose CITbook 30 to create a professor CITbook 40 directed to a particular subject as described below.

The general purpose CITbook 30 includes a presentation module for providing rapid and effective visual and auditory presentation of the media to students. The media includes text, video, audio, figures and computer programs that produce animations and execute mathematical model simulations. The assembly of data modules 60 and data managers 200 enable both original authors and a final teacher who works with students to input, format and display their educational material in the manner deemed most appropriate.

The professor CITbook 40 is multimedia educational knowledge base and tool for a lecturer or professor that enables the professor to guide students through the knowledge base of a selected subject matter. For example, one professor CITbook can be generated using the data-entry modules 60 of the general purpose CITbook 30 to include subjects for understanding and building modern neural prostheses. The professor CITbook knowledge base is limited to contain the "truth," in other words well-accepted and proven theories and concepts. To ensure that information is the "truth," it is compiled and reviewed by recognized experts in the various, relevant scientific areas of a particular subject before the information is inputted, organized and categorized into the system. Once generated, the knowledge base contained in the professor CITbook 40 represents the "truth" as it is presently accepted by a community of scientists and engineers working in the field which has been contributed to the system. The knowledge base is ordered and linked in a primary sequence that represents a preferred presentation sequence that the information should be presented for optimal reader comprehension.

The student CITbook 50 is an interactive multimedia tool for education that includes some form of the well-accepted knowledge base of the professor CITbook 40. Using a variety of data managers included in the general purpose CITbook 30 (described below), a professor can customize and modify the well-accepted knowledge base of the professor CITbook 40 to generate a student CITbook 50 adapted for the professor's class. Any added, deleted or modified portions are visually distinguished from the well-accepted portions so as to be identifiable by a reader. The professor can also customize the preferred sequence to generate a customized presentation sequence for his/her class in accordance with a desired syllabus.

The student CITbook 50 executes and presents its stored knowledge base in the preferred or customized presentation sequence. A reader, however, can deviate from the presentation sequence by accessing knowledge in areas in which they may be lacking sufficient background information to comprehend the material presented. Furthermore, the student CITbook 50 allows students to run simulations, for example, of neuron models to understand how an electrically activated nerve responds to an applied field. With assigned data links and multimedia routines, text is supplemented with video clips of experts discussing and interpreting pathology findings, physiology experiments and the operation of neural prostheses by end-users.

Using a note module described below, students can add notes in the margin of the presented material as they might in a conventional textbook. The note module stores and links the added notes to the presented text such that the notes appear with the presented text. The student CITbook 50 allows students to access data bases related to knowledge contained in the student CITbook 50 and query libraries about new information that has appeared since the student CITbook 50 was last reviewed by a panel of expert biomedical engineers and made available in the professor CITbook 40.

Data Modules

With reference to FIGS. 2*a*–2*i*, the general purpose CITbook 30 is created based on an assembly of data entry modules 60. The data modules 60 each process a particular type of data including text, images, illustrations, simulations, audio and video for inclusion into a professor CITbook 50. For example, data relevant to the field of biomedical engineering and in particular, relating to the comprehension and construction of neural prostheses is collected from technical fields including electronics, electromagnetic fields, mechanics, material science, neuroscience, electrochemistry, organ physiology and pathology, and other biomedical engineering specialties.

The collected data are reviewed by a peer review board that include a selected group of experts in the relevant field. The peer review board determine which portions of the collected data are well-accepted among experts in the relevant field. The well-accepted data includes data which is believed to be "true" at the time of review and of course includes established proven theories and topics. The set of well-accepted data is considered the "truth" in the relevant field of study and forms a primary knowledge base of the professor CITbook 40. Preferably, a separate professor CITbook 40 is generated for each selected scientific area or subject matter.

Once a professor CITbook is generated, it is distributed to educators, lecturers and the like so that they may customize it for their audience. Subsequent to the distribution, additional data is periodically collected and reviewed. The additional data which is determined to be well-accepted data is included into the professor CITbook 40 to update its primary knowledge base. The updated version is then distributed. In this manner, the primary knowledge base of the professor CITbook 40 is current and up-to-date with advancements in the relevant areas.

The following data-entry modules 60 receive and organize the well-accepted data based on its form and generate the primary knowledge base which becomes the professor CITbook 40 for a selected subject matter. For each data-entry module 60, a manual and module information 62 is generated. The manual and module information includes help screens and other reference information describing the functions of each data-entry module contained in the general purpose CITbook 30. Help sections are also included describing how to generate a professor CITbook 40 and its knowledge base.

Text

Figure 2A:
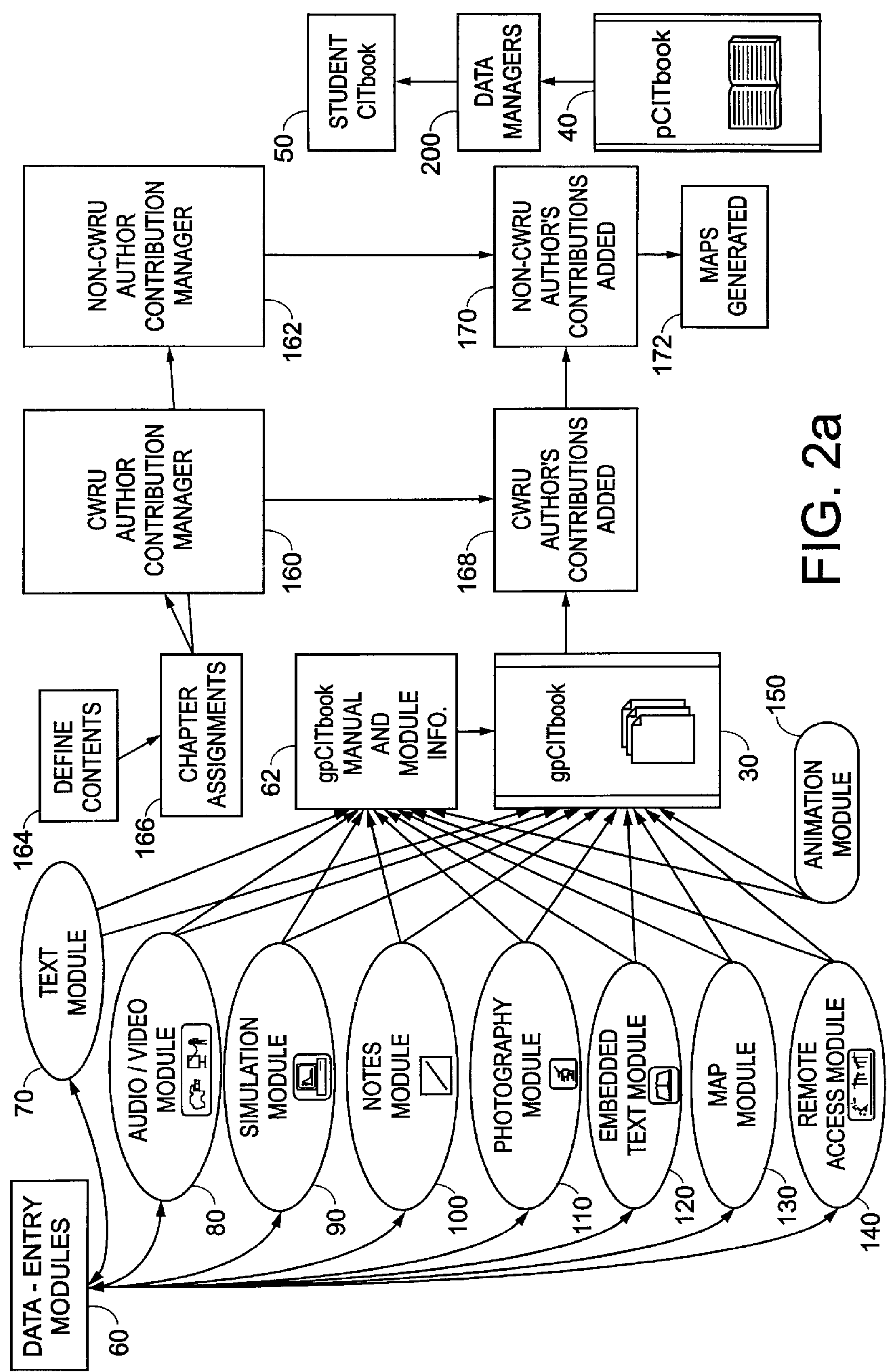
FIG. 2*a* is a graphical illustration of data-entry modules used for generating and modifying the present invention.
Figure 2B:
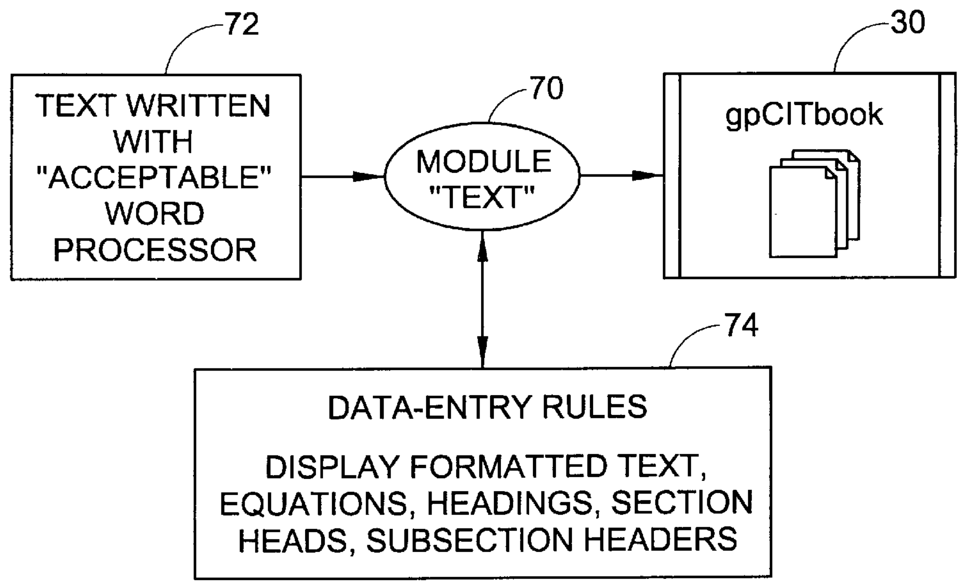
FIG. 2*b* is a block diagram of a text module shown in FIG. 2*a;*

With reference to FIG. 2*b*, a text module 70 controls entry of textual data 72 based on a set of predefined data-entry rules 74 or specifications for the document-entry process. The rules include specifying a selected data format which the data must comply with before it is accepted by the interactive system. The data-entry rules provide for formatting, organizing, categorizing and integrating the inputted material into a professor CITbook. For example, only certain fonts or certain characters are permitted and special tag words are generated to mark the beginning of new sections of material. Headings and emphasized words also receive special identification markers. Tables, columns, and equations require special rules to provide a consistent standard of depicting and recognizing their many facets. The rules 74 also include categorization rules which determine the category of each portion of entered text such as "Subject Matter," "Topic," "Chapter Title," and "Education Level." Categorization is performed for example by searching for key words or requesting the data-entry person to identify the material.

An alternative to generating a set of rules and restrictions with which inputted information must comply, the text module 70 provides a standard data entry form including blanks which are filled in. For example, the form includes "Subject Matter," "Topic," "Chapter Title," "Education Level," "Equation Number," "Table," etc. Alternately, the text module 70 allows certain structures of the form to be cut and pasted by users, e.g. like "New Paragraph" or "Table," to appropriate portions of the inputted document. In this way, many of the rules are easily complied with allowing the user to focus on entering the content of the material. With the selected entry rules, all information inputted into the interactive system will have a standard and uniform format.

Each categorized topic is then further organized and categorized into an appropriate chapter for the subject matter. The chapters are then ordered in a predetermined or preferred sequence. Additionally, a knowledge level of each topic is determined. The knowledge level includes levels such as elementary level, high school level, college level, graduate level, and expert level. Each knowledge level of each subject matter can be considered as a separate textbook such as a graduate level electronics book has contents which are different and more advanced than a high school level electronics book. The separation of knowledge levels provides access to reference material for some users while providing access to accelerated topics for others. The text module 70 distinguishes each knowledge level and installs them appropriately in the knowledge base of the professor CITbook 40.

Audio/Video

Figure 2C:
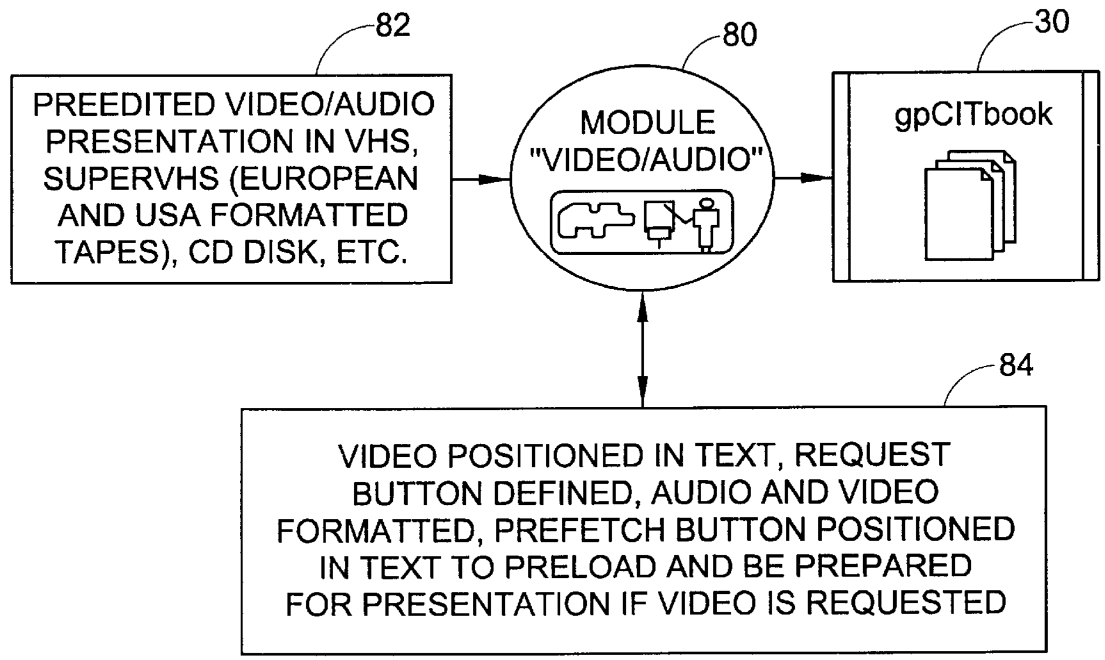
FIG. 2*c* is a block diagram of a video/audio module shown in FIG. 2*a;*

Similar to the text module 70, the other modules receive and organize specific types of data. With reference to FIG. 2*c*, an audio/video module 80 receives and organizes audio and video information and links this information with its corresponding text data. In this manner, audio/video data clips 82 are incorporated into the knowledge base of the professor CITbook 40 by links 84 to supplement textual instruction. Audio files may include instructions to accompany or narrate objects such as text, images or animations. Video and audio tracks together give readers special insights to the material. For example, professionally edited clips of overviews of clinical applications, showing implants, experimental testing, and patients using neural prosthesis, or of experts in bioelectric engineering of the nervous system presenting their expertise can be linked and presented with text. Professional video production specialists will dub a time index onto raw video and audio footage so that the desired portions may be logged and edited together to create the final audio/video presentation.

The audio/video module 80 includes predefined data entry specifications which define permissible formats that entered audio/video data must comply with. For example, the entry specifications define resolution, size, digitizing process, compression scheme and duration requirements. The entered data are then linked to the appropriate section(s) of the text for supplemental instruction during a presentation. The audio/video module 80 also logs the entered data into an "Index of Audio/Video Clips" file that provides a central, alternative way to access all clips without going through the text. Software routines update a time index of a selected audio/video track as it plays and includes volume, pause (freeze frame) and fast search controls for controlling the media as is known in the art.

In one embodiment, the interactive system requires individual authors to record, edit, log and dub their own audio/video material. Alternately, the interactive system includes video/audio editing hardware and software which provides these functions. Obviously individuals will still have to record on their own. The CITbook data entry specifications require that authors digitize desired video or audio tracks, ensuring that the levels (i.e. intensity, brightness, color, hue, volume, etc.), quality and compression of their material is consistent and complies with selected format requirements. Alternatively, they will have the option of sending a prerecorded laser disk or VHS or S-VHS tape to CITbook custodians and receiving back a digital version of their material with proper level settings on CD-ROM or another high-capacity storage medium.

Simulation

Figure 2D:
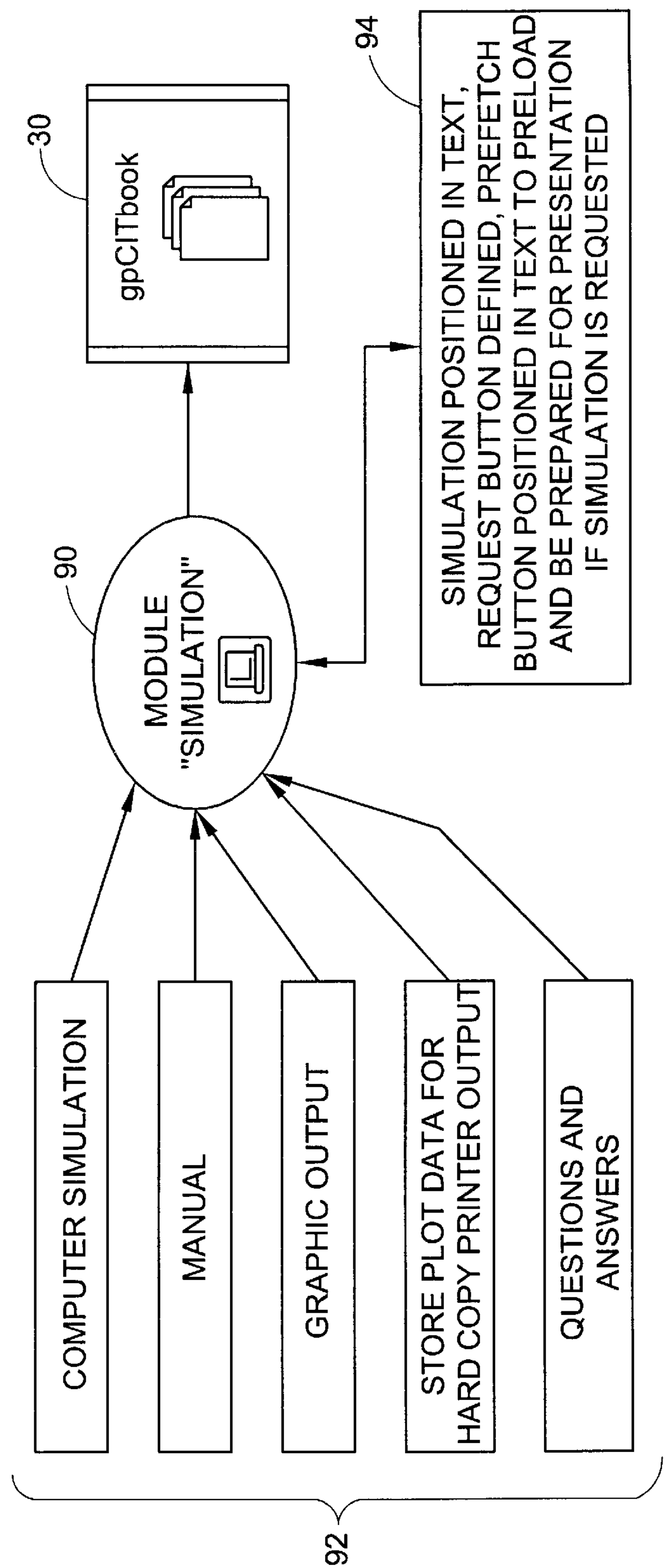
FIG. 2*d* is a block diagram of a simulation module shown in FIG. 2*a;*

With reference to FIG. 2*d*, a simulation module 90 receives and organizes mathematical equations, tables or other simulation data 92, for example, mathematical model simulations of nerve cells and axons with predetermined or user-chosen parameters. Simulation data are entered in a format which complies with the CITbook data-entry specifications and is linked 94 to corresponding textual data. The simulations include parameters preset by the author to illustrate certain points or allow parameters to be chosen by the reader during a presentation to investigate selected ideas or phenomena. The simulation module 90 configures the inputted simulation data to provide a user with flexibility in executing simulation models during a presentation with a variety of functions. For example, routines are included that provide the ability to enter parameter values, designate which variables serve as inputs or outputs, which variables are graphed, whether displays are frozen or written over between different simulations, and set initial conditions, ranges, configuration values for setting up output, and other selected parameters.

The simulation module 90 includes software which simulates selected active models which are known in the art, for example active models of nerve membranes. Additionally, neuronal simulation software routines are included for executing these models and other components and include functions to selectively create and connect compartments and stimulate nerves. Of course, other simulation models can be included based on the scientific field to which the inputted data belongs. The simulation module 90 further includes functions allowing authors to install their own simulations as stand-alone programs or as part of their choice of mathematical software for inclusion in the CITbook. Functions for editing another author's simulations will be provided as desired.

In one embodiment, simulations are integrated to resemble separate programs which are accessed through the CITbook. The software is generated using an existing mathematical environment having established, tested and user-friendly functionalities. Using existing software packages like MATLAB by The MathWorks, Inc., or Mathematica by Wolfram Research, Inc., provides many users with familiar user and programming commands. Because versions of these packages exist on many different computer platforms, simulations are easily transportable between computers. Generally, user manuals and help files are written to accompany them.

Using a link manager described below, simulations can be selectively linked to appropriate sections of text, equations, graphs or other objects for providing supplemental instruction during a presentation. For example, within a textual explanation of a model in the text, clicking on an equation describing that model opens a simulation. Alternately, simulations that provide appropriate physiological responses to given inputs may be linked with an audio/video clip to construct a virtual animal experiment. Simulations are logged into an "Index of Simulations" file that provides a central, alternative means of accessing them without going through the text.

Alternately, the CITbook includes a custom simulation model environment including predefined standards and rules for inputting and creating models. The predefined standards provide uniformity between different programs accessed by the CITbook. The programs appear more as part of the book and less as separate programs. The predefined standards for creating and running simulations facilitate building a simulation for any equation in the CITbook so that posing and striving to answer questions is easily performed by the user. Input and edit routines allow editing of simulations for corrections, additions or changes as desired by an author. Custom simulation software requires specific interfaces to run simulations on each selected computer platform. However, programmers have the freedom and flexibility to make features straightforward, obvious and dedicated to a desired task.

Notes

Figure 2E:
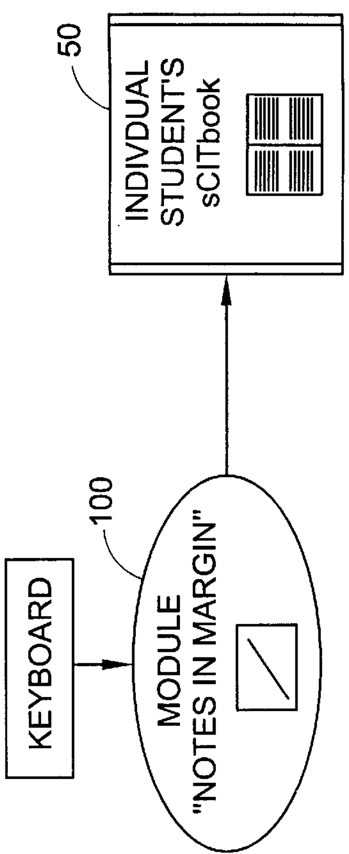
FIG. 2*e* is a block diagram of a notes module shown in FIG. 2*a;*

With reference to FIG. 2*e*, a notes module 100 allows the user to input personal notes during a presentation within margins of displayed text which are then stored and linked 102 with the corresponding text. The notes module 100 is a sub-section of a student contribution manager which is described in detail below.

Illustrations

Figure 2F:
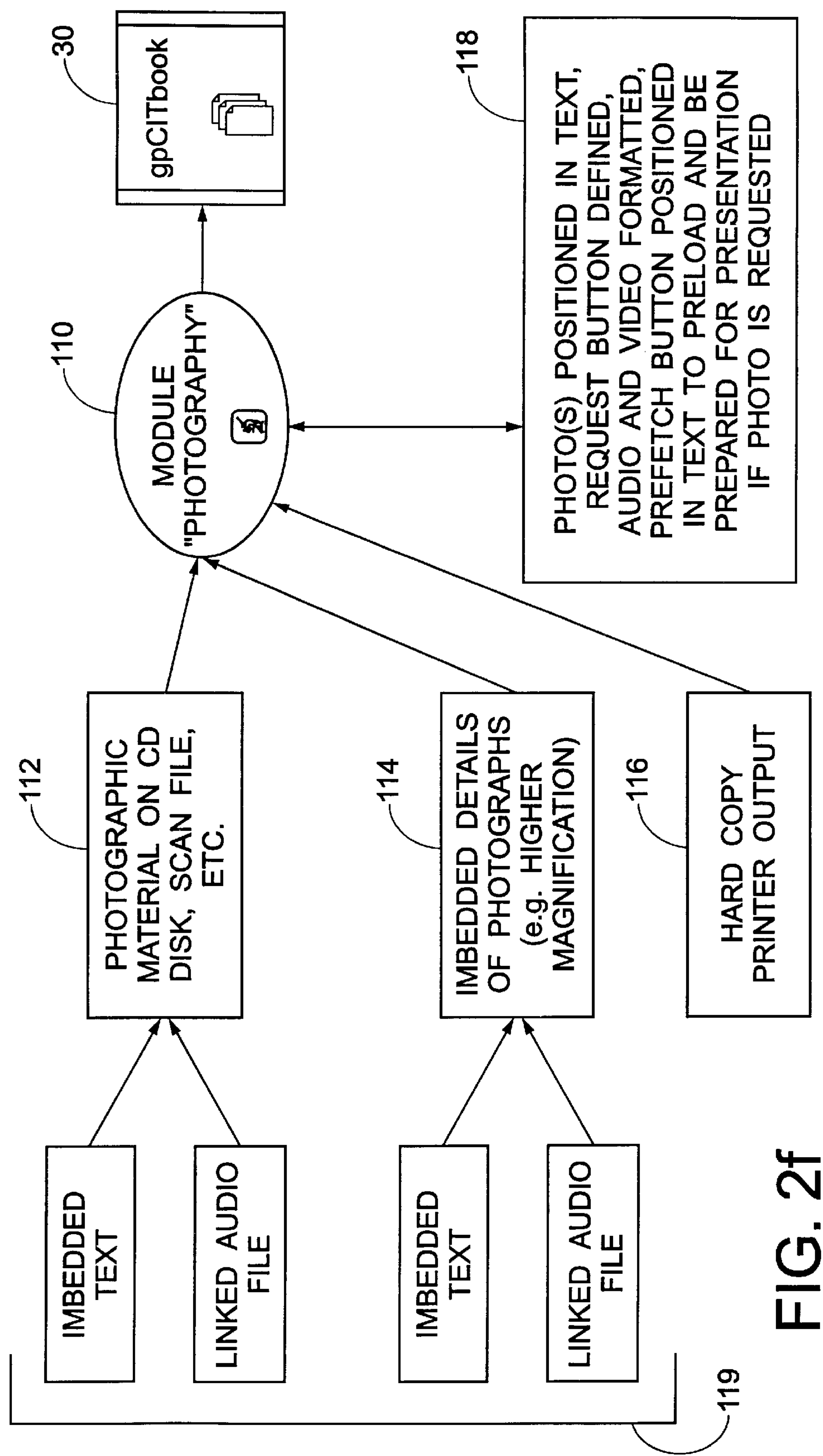
FIG. 2*f* is a block diagram of a photography module shown in FIG. 2*a;*

With reference to FIG. 2*f*, a photography module 110 receives and organizes images, illustrations and photomicrographs 112, high-resolution and magnification images 114, and hard copy output 116. The photography module 110 supports all types of illustrations and images found in traditional textbooks. For example, line art items will include various graphics, flow charts, tables, bar graphs, block diagrams, x-y plots, pie charts, etc. These can be created in the author's choice of graphics processing software then rendered into one of several specified representation standards defined by the data-entry rules of the system. Images can include digitized representations of photographs, slides, or frames of catheter, microscope or other live or taped video sources. The authors may scan these images themselves or send the materials away to have them scanned and receive them back on a CD or other high-capacity digital storage media. As with the line art, the images can be rendered to a specified resolution and size via the authors' choice of image processing software.

All illustrations are labeled with a textual title or heading and stored in separate files. These files are then "linked" 118 to appropriate portions of the text to supplement and support the textual information. The interactive system generates and controls links with a link manager which will be described in detail below. Links can be generated as active links such that the illustrations automatically appear with associated text. Links also can be generated as passive links where only a button representing the passive link is automatically displayed with the associated text. Selecting the button opens and presents the illustration linked to the button. Illustrations are logged into an "Index of Illustrations" that provides a central, alternative way to access the illustrations without going through the text.

Illustrations are combined with other data links 119 providing many other capabilities beyond just displaying them. Linking images together allows magnified portions of an image to appear embedded within that image. As the user views a full-view image during a presentation, the photography module 110 defines boxes which are overlaid on the image. The boxes outline and identify portions of that image which are selectable in order to link to an image of the same area, but in higher magnification. Audio recordings may also be linked with an image or a series of images of increasing magnification or of related topics. At certain points in the audio file, links to other images can be automatically triggered. Presenting changing images linked with audible descriptions produce a slide show effect for the readers. The slide show may also be combined with animations, which will be described in more detail below, such as labels or moving pointers, superimposed atop the images. To keep track of a presentation, visible pointers are displayed to indicate the current area being presented. The pointer feature simulates a professor going through images and pointing out relevant aspects for the students.

Embedded Text

Figure 2G:
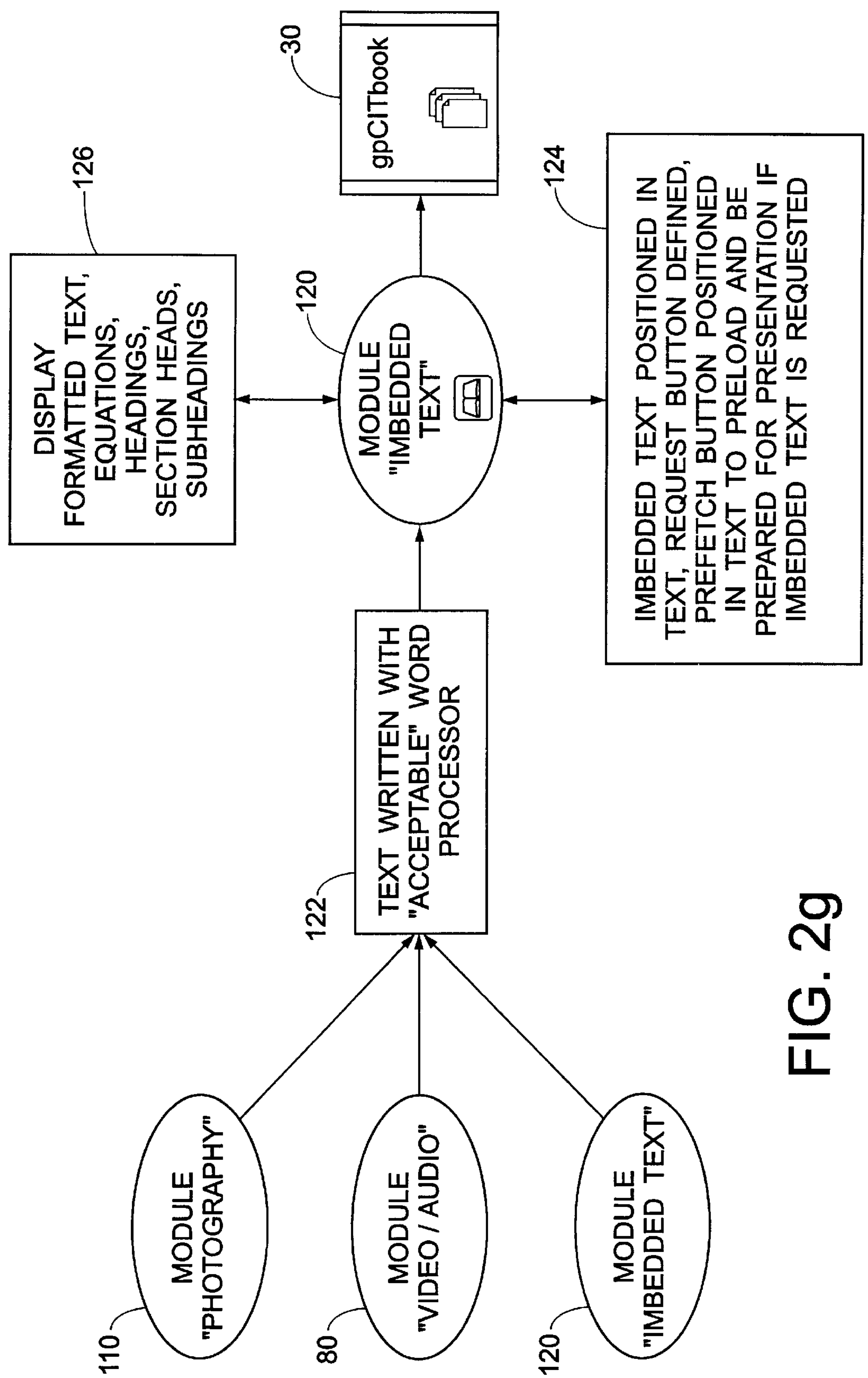
FIG. 2*g* is a block diagram of a embedded text module shown in FIG. 2*a;*

With reference to FIG. 2*g*, an embedded text module 120 allows selected portions of text 122 to be linked 124 with other reference data such as audio/video 80, a simulation 90, photography 110, or linked to other selected portions of text. To assist in the linking process, text identifiers are displayed 126 to a user. This module is a sub-module of the link manager which is described in detail below.

Maps

Figure 2H:
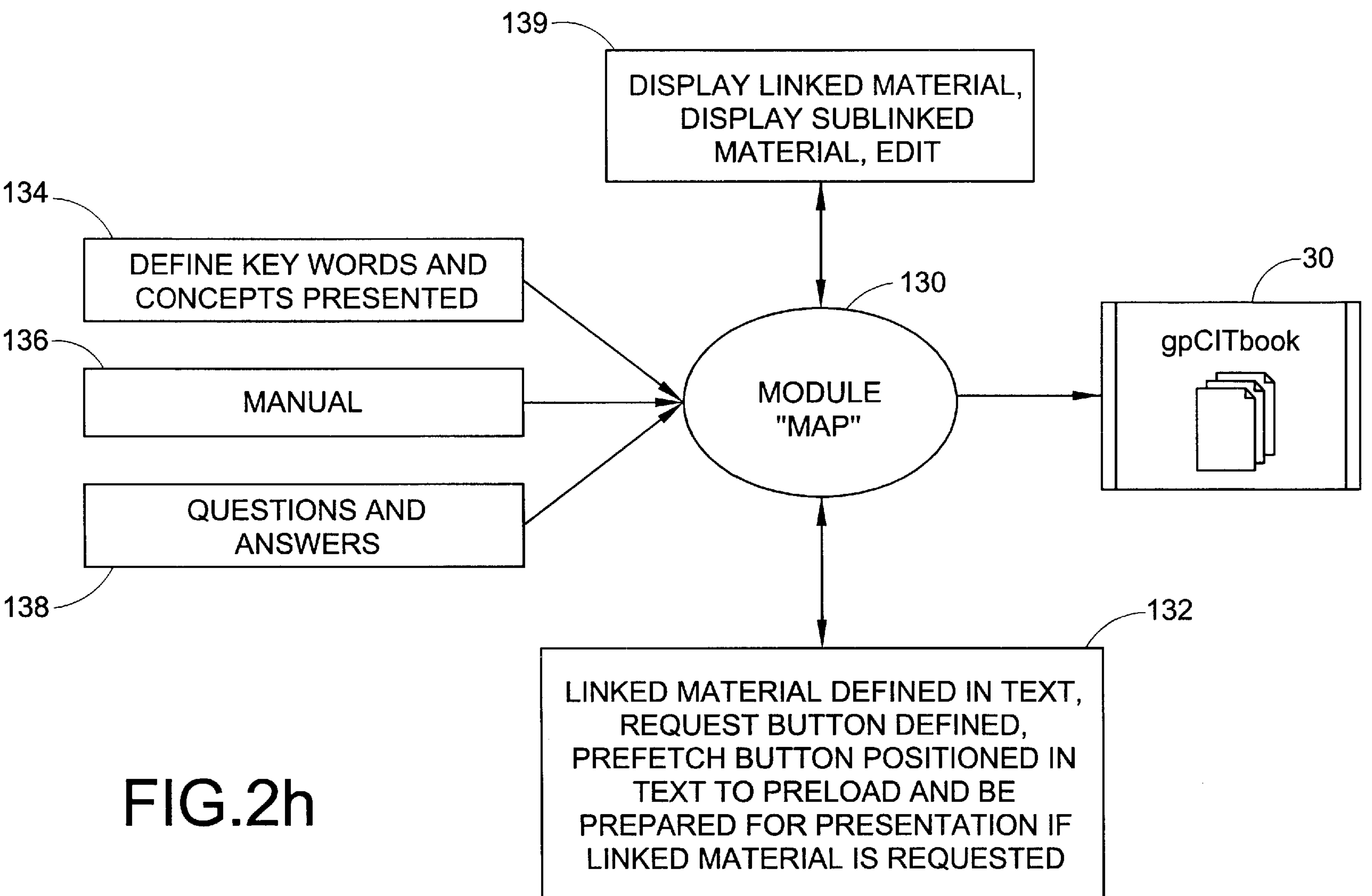
FIG. 2*h* is a block diagram of a map module shown in FIG. 2*a;*

With reference to FIG. 2*h*, a map module 130 allows professor CITbook 40 and student CITbook 50 creators, namely professors and other experts, to define a preferred presentation route through the knowledge base by creating data links 132 between topics or objects and also allows student CITbook 50 readers, for example students, to create customized presentation routes which become personalized sequences. The links are created in many ways such as by linking all similar key words 134, manually selecting links 136, and linking objects based on a set of questions and answers 138. The generated links are displayed 139 to the user for verification and modification. This module is a sub-module of the link manager which is described in detail below.

Remote Access

Figure 2I:
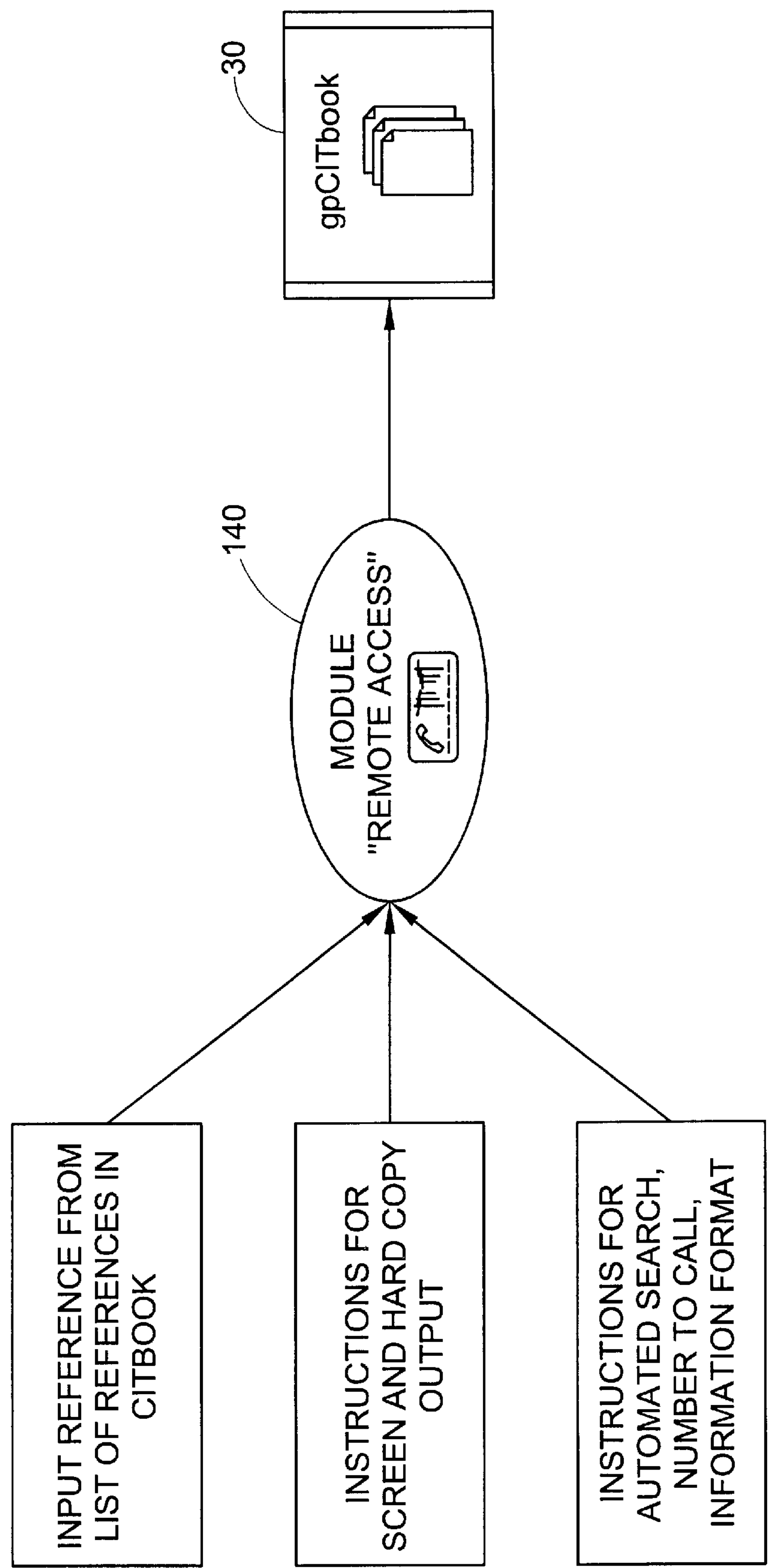
FIG. 2*i* is a block diagram of a remote access module shown in FIG. 2*a;*

With reference to FIG. 2*i*, a remote access module 140 provides data communication to a modem or network. Once a connection is established, a user can access libraries or other databases to retrieve scientific reports cited in the text of the CITbook. Through a communications device, CITbook users have, as appendix-like structures to assist in their studies, access to dial-in services and network hosts that hold growing repositories of information. Users can connect to the "Citation Index" to discover if an author cited in a bibliography appearing in the CITbook has published or has been cited in more recent works since the release of the CITbook. The "Citation Index" is a citation database service provided by the Institute for Scientific Information located in Philadelphia, Pa.

The remote access module 140 includes data searching functions which access libraries and attempt to locate specific references designated by the user. Examples of searching patterns include searching for name of author, title of work, subject matter, key words, or any combination of search terms. Additionally, the user can request to search medical and engineering databases which are maintained on remote CD-ROMs. Network and modem connections, which are well-known in the art, provide users with the ability to send electronic mail to authors, editors, or publishers of the CITbook to pose questions or comments.

Animation

Figure 2J:
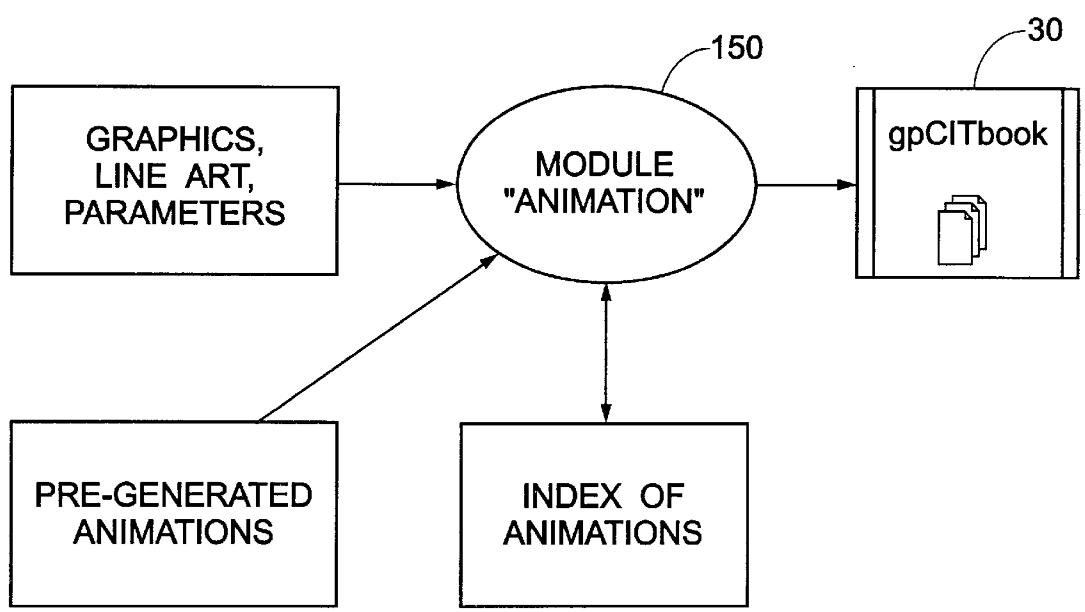
FIG. 2*j* is a block diagram of an animation module shown in FIG. 2*a;*

With reference to FIG. 2*j*, an animation module 150 controls the execution of animations which support other data and promote learning. The animation module 150 includes graphics hardware, software, or a combination of both which process, manipulate and display graphics. The graphics include a predefined series of objects and line art drawings having presentation parameters such as a selected speed, frequency, and orientation. The graphics are either overlaid on some information or alone against a colored background. The animation module 150 controls drawing and moving arrows in order to emphasize important details in text or images, show interactions between simplified illustrations, and demonstrate phases associated with courses of events depicted in time-series plots. Thus, much like a lecturer might do with a pointer and a piece of chalk, the CITbook presents animations to visually illustrate challenging or important aspects of the material that are difficult to address with mere text. For example, annotating a series of images, not only with an explanatory audio recording but also with animated labels or pointers to indicate whatever the narration is discussing, will produce a slide show presentation. As another example, presentations are demonstrated in a cartoon-like nature through slight variations in a series of abstracted illustrations. This produces animation of movement of some physical quantity, such as the flow of ions across a membrane or the propagation of an action potential along a nerve.

All animations are labeled with a textual title or heading and stored in separate files. These files are then selectively linked to portions of text, images, or other objects for supplemental instruction while reading the CITbook. Animation links are passive by default rather than executing immediately when the text or object to which it is linked is presented to the user. That way the user is able to see that an animation exists and is available, but it will only execute when the user manually selects it. Animations are logged into an "Index of Animations" that provides a central, alternative means of accessing the animations without going through the text.

Alternately, the animation module 150 allows entry of pre-generated animations created by users with an existing software package that has established, tested and user-friendly functionalities. Existing software such as MacroMedia Director is well-known by many users and allows quick generation of animations due to its familiar commands. In this embodiment, the animation module 150 includes rules for receiving and recognizing the data format of the existing software package for incorporation into the CITbook.

In summary, a professor CITbook 40 is generated containing a primary knowledge base including selected subjects from collected data that have been determined as the "truth" in a particular scientific area. The primary knowledge base is organized, for example, into subject matter, chapters and knowledge levels and a preferred presentation sequence is assigned. Additional data links are created selectively connecting desired subjects, knowledge levels, topics, and portions of text to each other that define secondary links. The professor CITbook 40 is then distributed to professors and educators who work in the related subjects. The CITbook further provides customization features allowing a professor to customize the primary knowledge base of the professor CITbook in accordance with the anticipated needs of his or her own audience(s).

Contribution Manager and Professor CITbook 40

Figure 3:
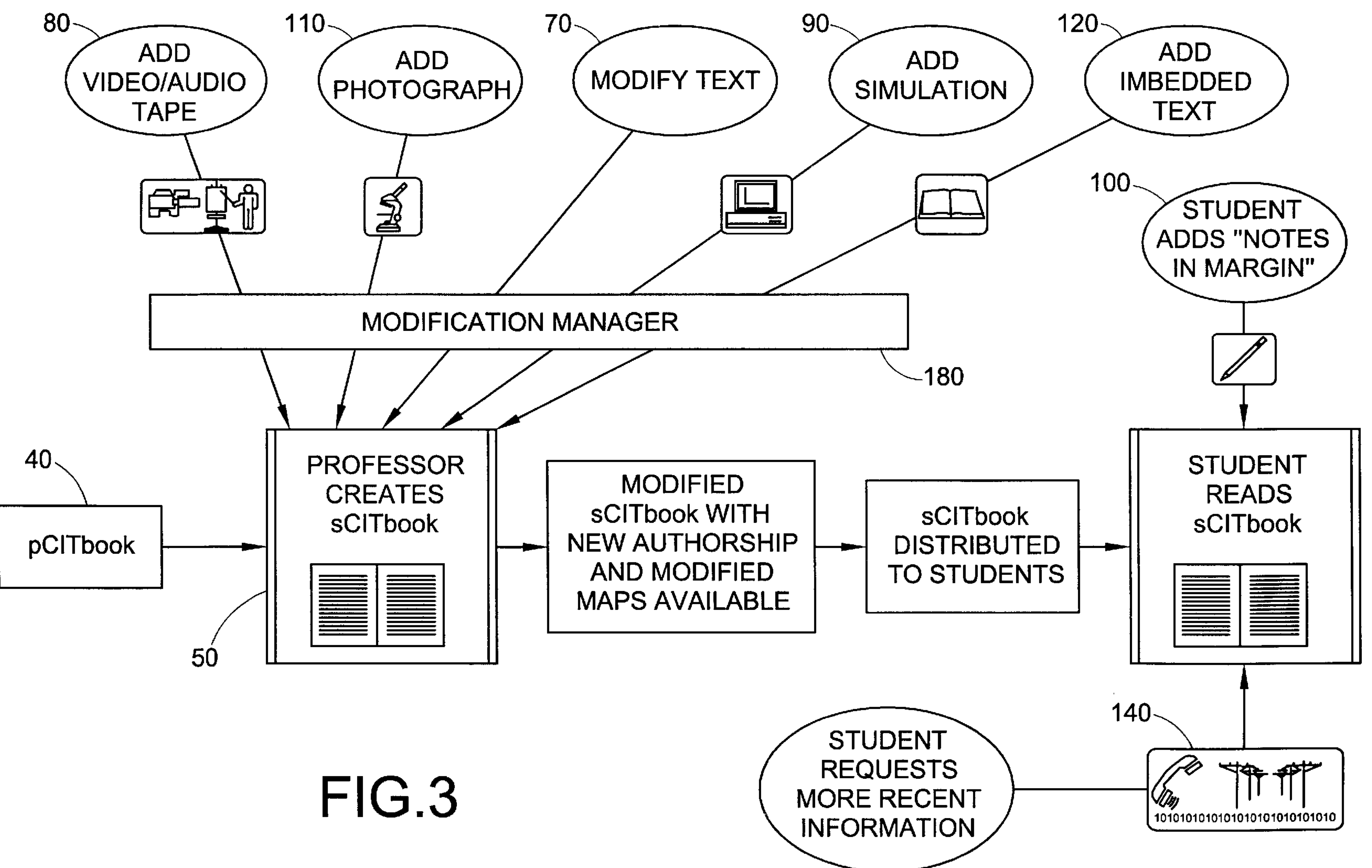
FIG. 3 illustrates the generation of student customizable interactive textbook from a professor customizable interactive textbook.

With further reference to FIG. 2*a* and FIG. 3, the general purpose CITbook 30 system includes contribution managers 160 and 162 to control access to the data-entry modules 60 for adding material into a professor CITbook 40. In other words, the contribution managers are "front-end" interfaces between a contributing author and the general purpose CITbook 30.

The contribution managers include two managers. One controls internal contributions 160 from original or approved authors, and one controls external contributions 162 from authors wishing to use a modified version of the CITbook in their course. Alternately, one contribution manager may be used for both types of authors as described in the Expert Contribution Manager section below.

A contributing author defines the contents 164 of the information being contributed and identifies chapter assignment 166. Once the appropriate data-entry module 60 receives and organizes the data, a contribution adding routine 166 adds and combines the organized data to selected sections forming the professor CITbook 40 knowledge base.

The external contribution manager 162 is identical to the internal contribution manager, except that it allows outside authors to access the general purpose CITbook 30 to contribute to the professor CITbook 40. An external contribution adding routine 170 then adds and combines the inputted information to selected sections from the professor CITbook 40. Alternately, the adding routines 168 and 170 are performed by one module.

With further reference to FIG. 2, a map generator 172 operates with the contribution manager and allows the professor to define and create a preferred map or sequence which should be followed during a presentation of the material. The maps represent navigational routes through the subject matter by linking selected subjects or chapters within subjects in the preferred or primary sequence. The primary sequence becomes the presentation sequence executed during a presentation of the material. By generating preferred presentation sequences with the map generator, a preferred course syllabus is generated for the subject matter of the professor CITbook 40. As described below, a professor may customize the preferred sequence to suit his/her course to focus on selected topics and skip irrelevant topics based on the course or student body which is being taught. Any customization becomes part of a student CITbook 50 thus preserving the knowledge base of the professor CITbook 40.

When using the student CITbook 50 at a lecture, the professor initiates the predetermined presentation sequence for a selected material. The system processor executes the preferred or customized sequence by retrieving the data according to the links defined in the predetermined sequence. The retrieved data are sent to the presentation manager which presents the data through the output device which includes multimedia components for presenting various formats such as textual, graphical, video/audio, and simulations. The presentation thus serves to educate student users.

Additionally, secondary links are generated to connect the selected data in any desired secondary sequence. The secondary links are passive links meaning that they are not automatically executed during a presentation. Rather, the secondary links allow the student to access information other than the information being currently presented. For example, these links allow the student to retrieve background data, advanced topics, and other reference data to supplement the presentation. When a secondary link is selected, the processor interrupts the presentation or primary sequence and continues presenting with the data connected to the selected secondary link. The primary presentation sequence is then resumed upon a command from the student.

Student CITbook

With reference to FIG. 3, once the professor CITbook 40 is generated from well-accepted knowledge determined by a community of experts, the same data-entry modules 60 used to receive, organize and categorize input data allow the professor to create a student version of the CITbook for distribution to students in his/her class. With the data-entry modules 60 (not all shown) and a modification manager 180, the professor generates a customized student CITbook 50 by altering, adding and deleting any material existing in the primary knowledge base of the professor CITbook 40 as well as adding personal topics. In this manner, the professor facilitates the ability to present in an organized and reproduceable manner subject matter and topics that the professor deems most appropriate and in a preselected sequence.

Figure 4:
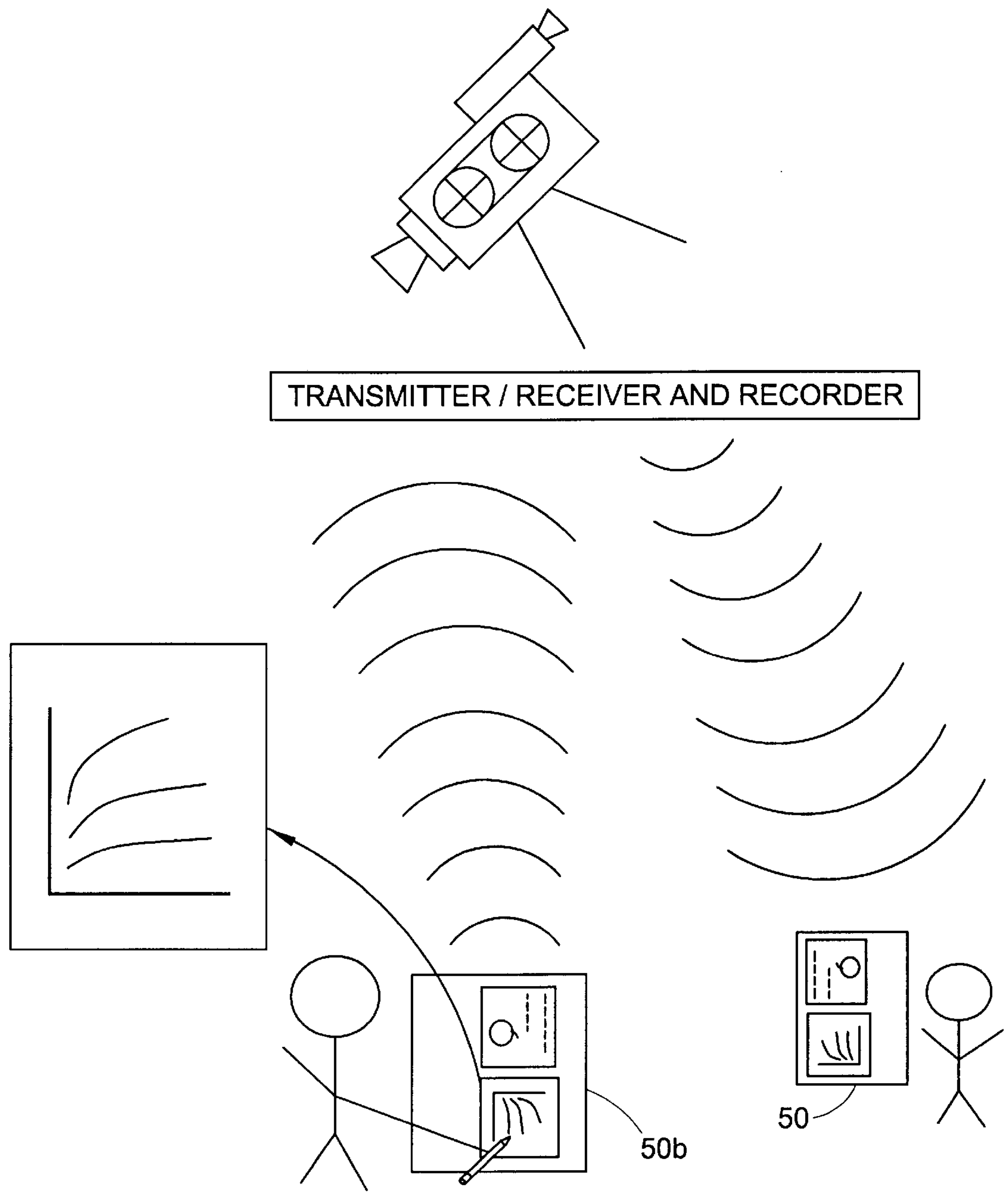
FIG. 4 illustrates wireless communications between a professor and a student in a classroom.

With reference to FIG. 4, in a classroom environment, each student CITbook 50 is in data communication with the professor's copy of the student CITbook 50*b*. In one embodiment, each student CITbook 50 is directly wired to the professor copy 50*b*. Alternately, a wireless network is used. For example, the professor copy CITbook 50*b* transmits signals such as infrared, radio, microwave, or the like which are received by each of the student CITbook 50. In this manner, as the professor enters notes or highlights text on the professor copy, these changes are simultaneously sent to each student CITbook 50. Additionally, the professor copy 50*b* is similarly connected to a projection screen which simultaneously displays whatever is displayed on the professor copy CITbook 50*b*. Notes added to the professor copy CITbook 50*b* are thus communicated, stored and linked in each student CITbook 50. This frees the student to think and add personalized notes rather than have to copy material from the board or screen. Place markers can also be transmitted to each student to maintain the proper position of the lecture.

Data Managers

Figure 5:
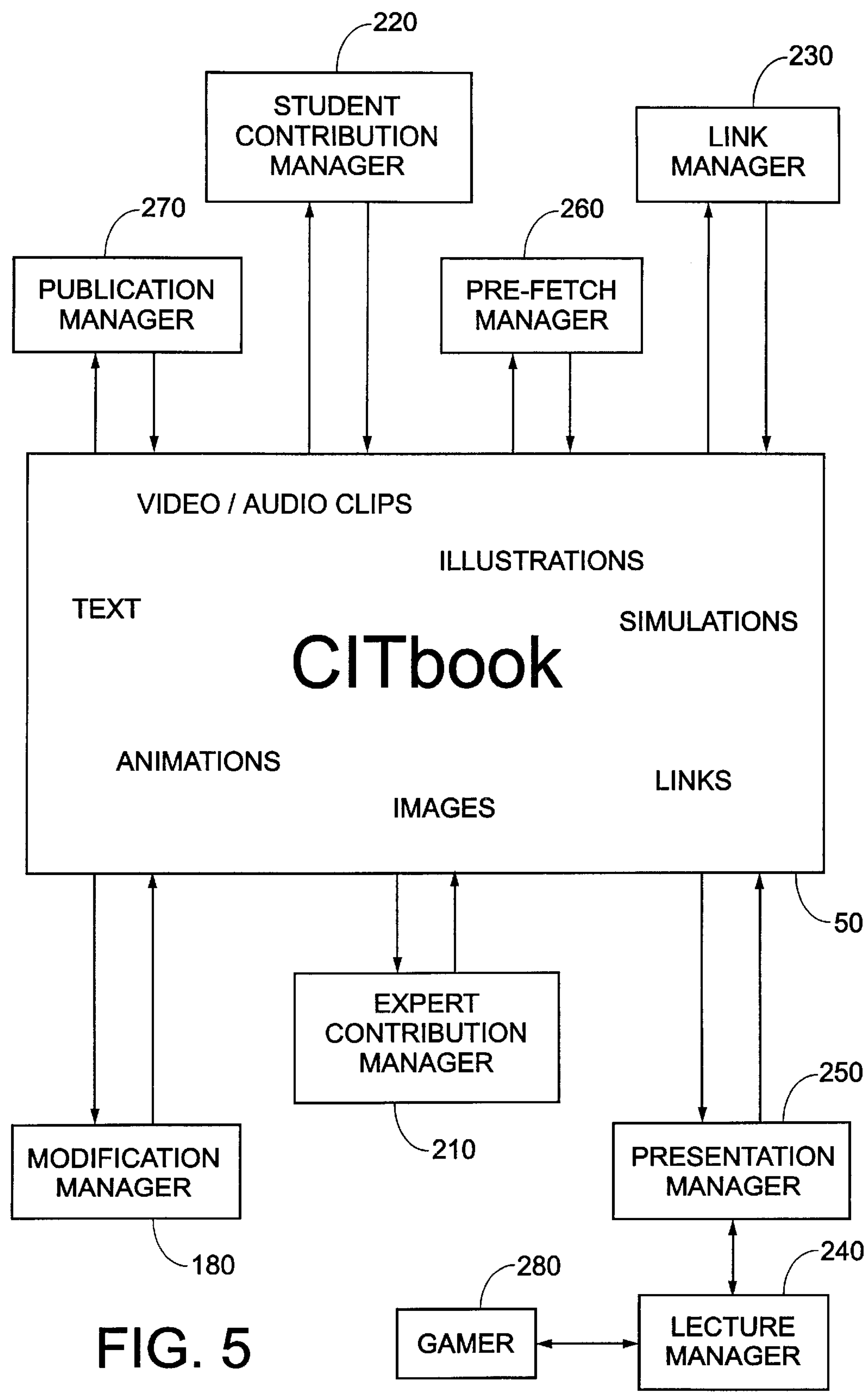
FIG. 5 is a block diagram of the interactive system of the present invention including data managers.

With reference to FIG. 5, a configuration of the customizable interactive textbook is shown including a variety of data managers. The data managers (1) allow a professor to customize a professor CITbook to generate a student CITbook and (2) control presentation of the material contained in the student CITbook. Of course, other data managers can be included as desired. As explained previously, the preferred embodiment includes a primary knowledge base containing a collection of biomedical engineering information which has been inputted, formatted, organized, and categorized into a professor CITbook. The data includes text, audio/video data, illustrations, simulations, animations, images and data links. The following data managers include components of hardware, software, or combinations of both which perform their selected functions.

Expert Contribution Manager

Figure 6A:
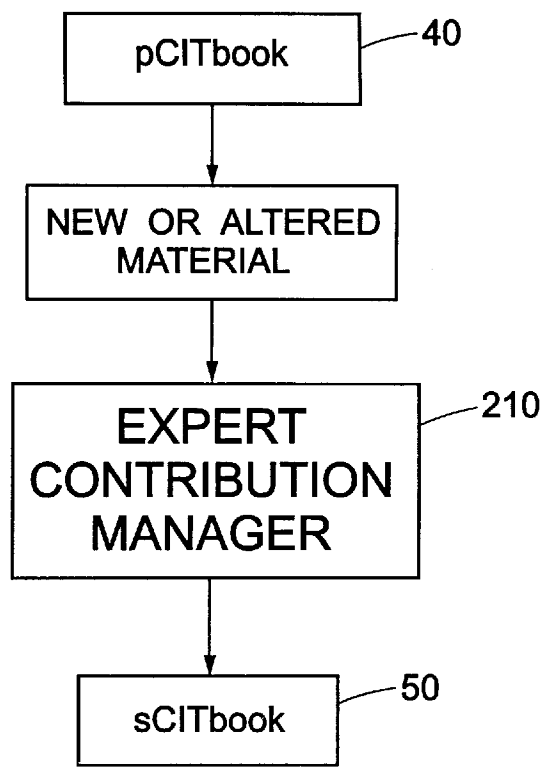
FIG. 6*a* illustrates an expert contribution manager in accordance with the present invention.

With reference to FIG. 6*a*, the expert contribution manager 210 controls the inputting, deleting and modifying of the primary knowledge base of the professor CITbook 40 to generate a customized student CITbook 50. For inputting new material, the expert contribution manager 210 functions similar to the contribution manager 160 by providing access to the data-entry modules 60. Alternately, one contribution manager is used for both preliminary and subsequent data-entry functions. Thus, in a preferred embodiment, the expert contribution manager 210 is a front-end interface to the data-entry modules 60. However, rather than generating a professor CITbook, a student CITbook is generated based on the inputted material and the information contained in the professor CITbook. Alternately, the expert contribution manager 210 is a separate data-entry manager which includes similar functions as the data entry modules 60.

The expert contribution manager 210 controls the addition of personal topics from authors and professors which are combined with selected sections of the professor CITbook for form a student CITbook 50. By customizing the professor CITbook, a professor can focus on selected subjects and topics relevant for a selected course being taught by the professor. The new material is then distinguished from the well-accepted material of the primary knowledge base and linked to appropriate sections in the student CITbook 50. The expert contribution manager 210 also includes editing routines for modifying or deleting portions of the professor CITbook 40 in accordance with the professor's personal experiences. Any modified or deleted text is visually distinguished so that a reader can determine what material is the well-accepted "truth" of the professor CITbook and what material has been modified.

For inputting data, the expert contribution manager 210 includes a set of data-entry rules or specifications for the data-entry process to maintain a uniform appearance and utility. Similar to the text module 70, the data-entry rules control formatting, organizing, categorizing and integrating the inputted material into the student CITbook 50. For example, only certain fonts or certain characters are permitted and special tag words are generated to mark the beginning of new sections of material. Headings and emphasized words also receive special identification markers. Tables, columns, and especially equations require special rules to provide a uniform standard of depicting and recognizing them.

An alternative to generating a set of rules and restrictions with which inputted information must comply, the expert contribution manager 210 provides a standard data entry form including blanks which are filled in. For example, the form includes "Subject Matter," "Topic," "Chapter Title," "Education Level," and "Equation Number." Alternately, the expert contribution manager 210 allows certain structures of the form to be cut and pasted by users, e.g. "New Paragraph" or "Table," to appropriate portions of the inputted document. In this way, many of the rules are easily complied with allowing the user to focus on entering the content of the material. With the selected entry rules, all information inputted into the student CITbook 50 will have a standard and uniform format.

For identifying material, the expert contribution manager 210 requires a user to insert markers or labels in the document to designate and differentiate between different sections and objects. Predefined "<flags>" are entered into a text document by the author to identify a section or request a command. For example, an "<associate filename begin>" flag and "<associate filename end>" flag included in the text surrounding words indicate that material contained in the "filename" is to be linked to the surrounded words. The conventions are conveyed to the authors either in a set of instructions and requirements, or alternatively in a series of templates which are cut, copied, pasted and filled-in as desired by the author.

After the author creates and assembles files containing audio/video clips, images, illustrations, simulations, embedded or background text, and the main text which is the controlling component of the material, the expert contribution manager 210 links, stores, and formats the new material and incorporates it into the student CITbook 50. This process includes, for example, removing any "<flags>" from the text, inserting a link in its place, and storing the linked file in an appropriate location. Allowing authors to write text and use the features of their favorite word processor involves a two-step process. In the first step, a macro in the word processor creates an ASCII file by changing all formatting to textual flags, like "<L/R margins=1,1>" or "<begin bold>" and "<end bold>." Then in the second step, the expert contribution manager 210 searches and detects the textual flags and removes them while generating appropriate formatting to create the student CITbook document.

In another embodiment, the expert contribution manager 210 includes word processing-like functions available for typing and modifying directly into the student CITbook. Of course, images, videos, and simulations will still be edited and stored elsewhere, but the expert contribution manager 210 environment provides easy linking of the materials into the student CITbook.

Instead of templates and conventions, point-and-click, drag-and-drop creation and modification functions are included. For example, the author will simply drag or copy media into an index that holds all instances of that media, then point to a selected place in the text to which they want it linked.

Modification Manager

Figure 6B:
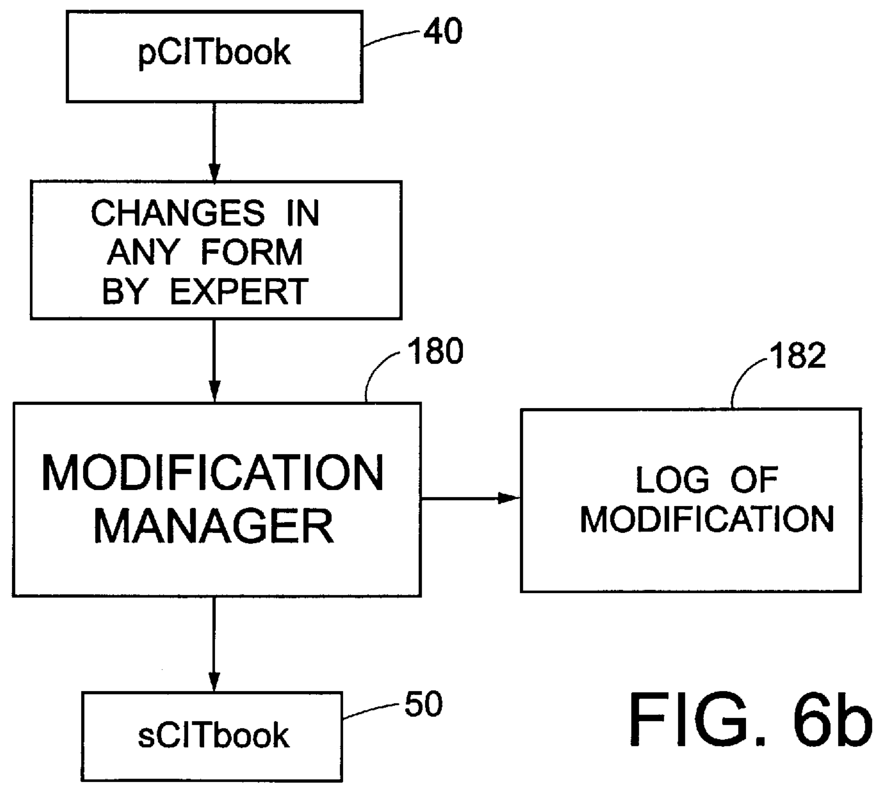
FIG. 6*b* illustrates a modification manager in accordance with the present invention.

With reference to FIG. 3 and 6*b*, a modification manager 180 operates with the expert contribution manager 210 to monitor any changes or modifications made by experts and generates a log of modifications 182. The modification manager further identifies the modified data with selected markings such as highlights, different fonts, and underlines. With these markings, a student reader can identify whether the material in the student CITbook was added by the professor or whether the material is the well-accepted "truth" of the latest edition of the professor CITbook 40.

The modification manager keeps a record, which is always available to the user, of what material was distributed in the current edition of the professor CITbook 40 and what new material is being added/altered. Normally, the new information will be visible and the old information, that was replaced or altered, will not. To distinguish modified information, the modification manager inserts a marker, for example a note or red bar, in the margin which identifies regions containing new information and hiding old information. In regions such as these, the modification manager enables a different presentation view. In that view, new information is underlined to show that it is included in the current student CITbook 50 version, but also to distinguish it as being added since the distribution date of the professor CITbook 40. Original information, which was approved and distributed in the professor CITbook and is being replaced by this new information, is not deleted but rather is represented with a strike-out red line. In this manner, the original information is identified as having been replaced, but is still obtainable by the user.

With the log of modifications 182, the modification manager reapplies or incorporates changes of the material made by an individual professor in creating a student CITbook 50 into subsequent editions/releases of the professor CITbook 40. Thus, the log of modifications 182 serves to assist a professor in creating subsequent releases of the student CITbook 50 which still contain the professor's previous customization effort but which are based on new editions of the professor CITbook 40. If the sections of the professor CITbook 40 that were originally modified by the professor in creating the student CITbook 50 have not been altered from the previous edition to the new edition, the modification manager will be able to use entries in the log of modifications 182 to automatically re-make those same changes to the new edition of the professor CITbook 40 thus creating a new edition of the student CITbook 50. If these sections of the professor CITbook 40 have been altered, then depending on the degree to which the new edition of the professor CITbook 40 has been changed from the previous version, the log of modifications 182 allows the modification manager to assist the user in manually re-making those changes or indicate to the user that the previous modifications are not applicable or are impossible in the new edition. An additional purpose of the log of modifications is to assist in distinguishing and screening changes made by outside authors for possible inclusion and distribution in the next edition of the professor CITbook 40.

Student Contribution Manager

Figure 6C:
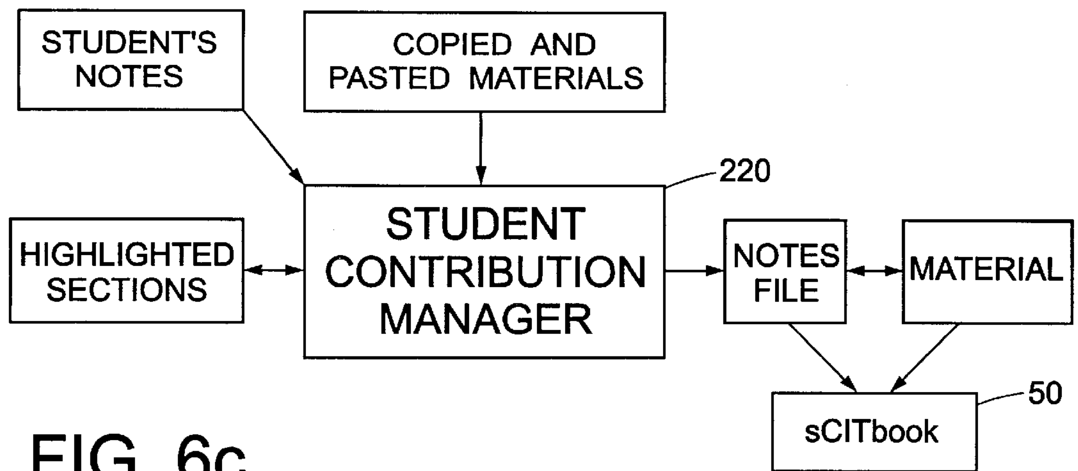
FIG. 6*c* illustrates a student contribution manager in accordance with the present invention.

With reference to FIG. 6*c*, a student contribution manager 220 is an interactive subsystem used by a student, which include all readers of the CITbook, who is navigating through the material of the student CITbook 50. As is true with a traditional printed textbook, students are not permitted to add, modify, or delete portions of the student CITbook. Instead, the student contribution manager 220 includes a note module 100 shown in FIG. 2*e*. At any given page of the interactive textbook being presented to the student, the note module 100 allows the student to insert personalized notes as clarifications or reminders relating to the material on the page. The note module assigns a data link with the notes to the current position of the data on the page and stores the notes. Upon a subsequent presentation of this page, the student notes are automatically retrieved and presented along with the page. Alternately, notes are inactivated if too large to display.

The student contribution manager 220 further includes a highlighting module which allows a student to highlight selected text within the material which is permanently stored with the material until unhighlighted. An automated outlining feature selectively extracts inserted and highlighted notes and generates an outline that is stored into a "notes file". The notes file can then be printed in hard copy form for use outside the context of the student CITbook 50, for example when the student is studying away from the computer.

With reference to FIG. 6*d*, a preferred embodiment of a student CITbook 50 display is shown which may be seen by the student during a presentation. To further aid in marking important areas of material, the student contribution manager 220 provides several tools which function equivalently to their analogous counterparts used in conventional textbooks. Place-holder functions which maintain the student's position include dog-eared pages, "post-it"s, paper clips, and bookmarks. These functions allow students to create personal routines for locating certain types of information that they marked as important within the student CITbook 50. For example, paper clips mark material that is of interest for a short time or within the scope of a single chapter. The "post-it"s mark information that will remain important through the course of the book. The bookmark indicates material that was most recently considered before regressing to a previously marked section or to some reference information.

The note module 100 includes routines for generating clarification or memory-jogging notes. When generating notes, the note module allocates a selected amount of space for the notes in separate windows on the presentation screen and links the notes to the associated material.

The student contribution manager 220 is like a small version of the expert contribution manager 210. The student contribution manager 220 integrates a student's word processor files into the student CITbook 50 and allows entering notes and editing directly in the student CITbook 50. Copy and paste functions provide incorporation of text and images directly from the CITbook into notes rather than having to manually reproduce material. Thus, note files that are generated allow students to collect, export, edit, or print important material for their own personal reference. The note files also provide for adding thoughts directly into a student's copy of the text and drawing or typing on top of their copy of the images without modifying the actual CITbook material. Finally, the automated outlining feature selectively extracts and exports material that was highlighted in a chosen color into the notes file in an outline form including all chapter, section, and subsection headings.

In another embodiment and with reference to FIG. 4, the student contribution manager 220 includes functions to integrate student notes into the CITbook in other ways. For example, during a professor's lecture, essential information such as section titles and time of day at the start of discussion of each section, is transmitted to each student's terminal, laptop computer, or digital notepad, which they are using to take notes during the class. The transmitted information is then used to time stamp or index the students' notes. Subsequently, the student contribution manager 220 automatically links sections of transmitted and handwritten notes to the appropriate sections of the material in their own version of the student CITbook 50 based on the time stamp.

Link Manager

Figure 6E:
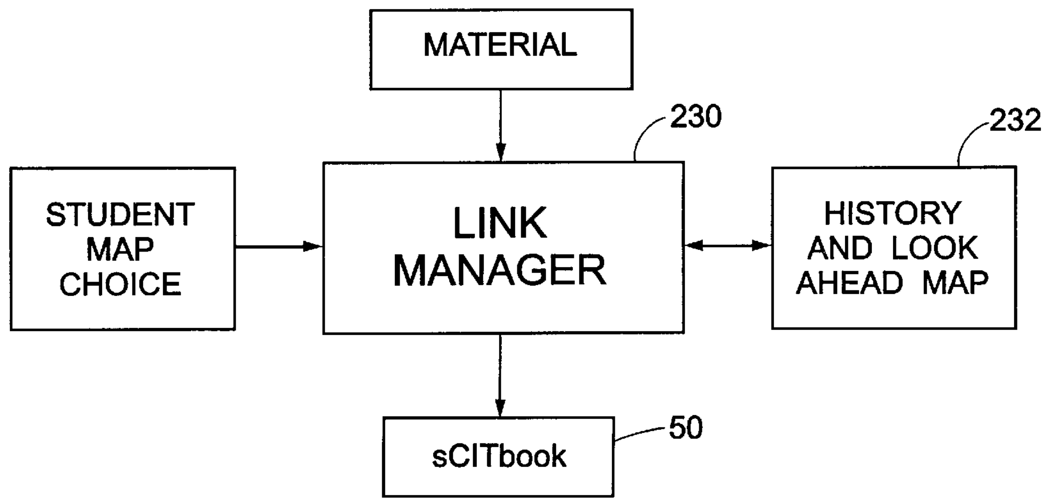
FIG. 6*e* illustrates a link manager in accordance with the present invention.

With reference to FIG. 6*e*, a link manager 230 controls the generation, assignment and modification of all data links between all the material stored in the professor CITbook 40 and the student CITbook 50. In the professor CITbook 40, for a specified group of chapters, links are created in a predetermined or preferred sequence linking the material together to define a primary route through the chapters similar to a course syllabus. Additionally, the link manager 230 provides for custom links to be created for defining a personalized sequence for the student CITbook 50.

At any time, a professor can access the link manager 230 through the input means to generate or modify data links for information contained in the interactive system. The link manager 230 generates selected links in the form of pointers, addresses, indexes, linked lists, trees, or any other data connection device as is well known to those of ordinary skill in the art. One purpose of the links is to connect a series of topics or chapters of a selected subject in a predetermined primary sequence in order to simulate a sequence of an actual textbook. With the predetermined sequence, when the subject is selected for presentation, the material of the subject is retrieved and presented to the student according to the predetermined sequence. The professor may also generate custom sequences in which selected topics or chapters of a subject are linked and others are eliminated from the sequence thereby allowing the professor to focus on only selected topics which are deemed important for a particular class.

In addition to the predetermined sequence which is executed for the presentation of a selected subject, the link manager 230 provides for the generation of embedded or hidden data links within the course material. Selected words can be linked with other words or the selected word can be linked to a related topic which has a different knowledge level.

With this type of link, a student who is unfamiliar with a word can activate an embedded link for the word, if a link exists. The interactive textbook will then interrupt the currently executing primary presentation sequence and begin executing a secondary presentation sequence defined by the destination of the embedded link. With these predefined links or secondary links, the student can jump from a current presentation of a graduate level course to an elementary or high school level of the same course in order to retrieve background information before continuing with the graduate level course. Of course, the links can be assigned to transport the student to more advanced levels of the selected subject.

Besides linking different knowledge levels of a particular subject, the link manager 230 provides for linking of topics which are indirectly related. For example, biomedical engineering students working on the construction of a neural prothesis are required to understand such topics as electronics, electromagnetic fields, mechanics, materials science, neuroscience, electrochemistry, organ physiology and pathology. During the presentation of a neuroscience subject, the student may come across topics related to electromagnetic fields. Although the student may well comprehend the neuroscience topics, he/she may require additional information relating to electromagnetic fields. With this in mind, the link manager 230 provides for the generation of embedded links between objects which appear during a presentation. For example, the information in the neuroscience subject can be linked to the indirectly related electromagnetic field subject. If the link is activated by the student, the presentation sequence is interrupted and transferred to the electromagnetic field topic and its predetermined sequence is executed until the sequence is ended by the user.

Figure 6F:
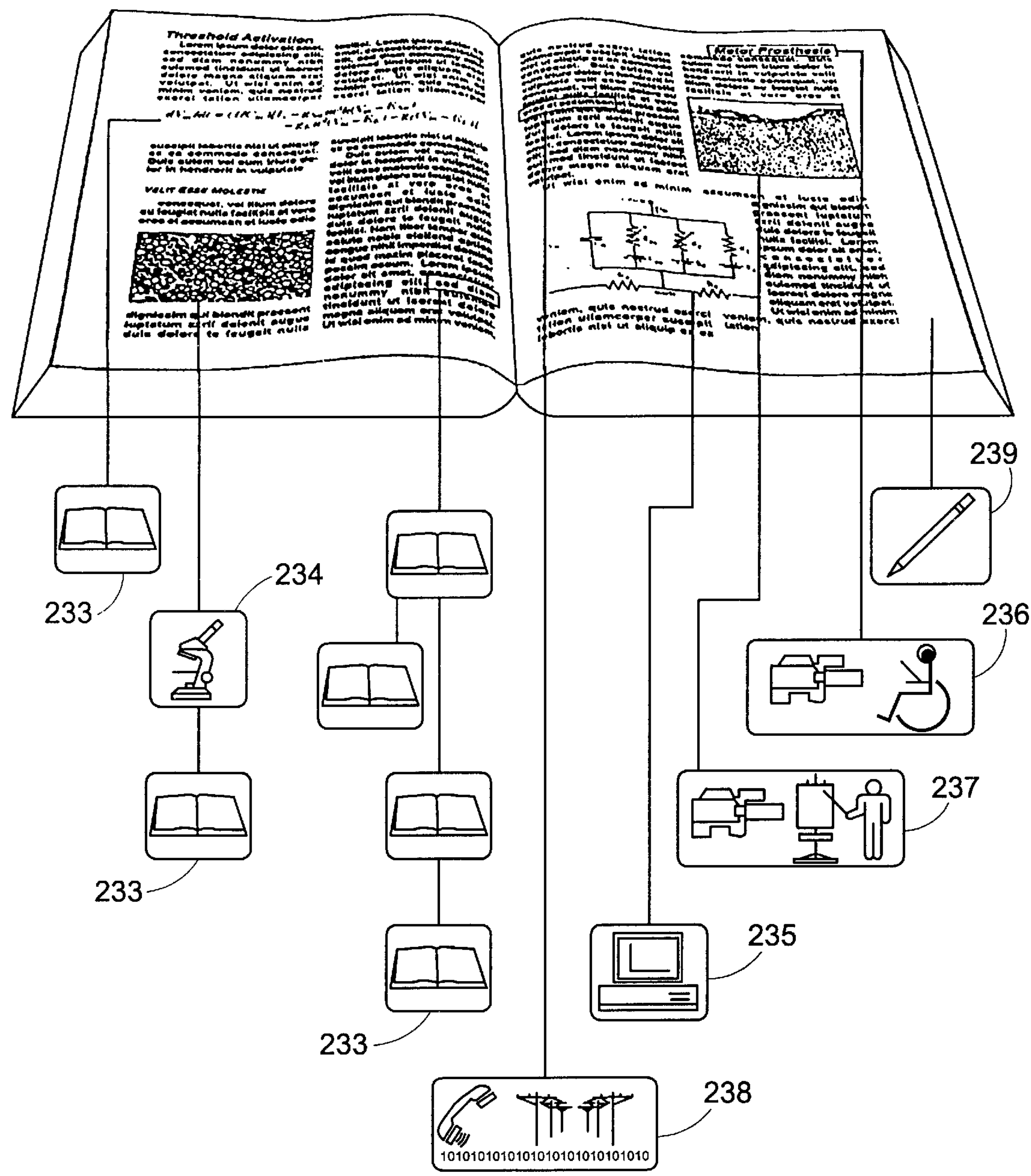
FIG. 6*f* is a symbolic representation of the interactive system including embedded links in accordance with the present invention.

With reference to FIG. **6*f*, a symbolic representation of the CITbook is shown including a variety of embedded links. With an embedded link, specific portions of text are layered or include an embedded object such as an illustration. The following are examples of embedded links provided by the link manager 230 and shown in FIG. 6*f***.

An embedded text link, identified by a book icon, defines multiple levels of reference assigned and implanted within a selected portion of text. The embedded text link 233 is an activatable symbol or highlighted text displayed on the screen. Once activated by the student user, background or related information which has been linked to the current text is retrieved and presented to answer questions and convey unfamiliar concepts to students who are lessversed in certain disciplines.

A magnify link 234, identified by a microscope icon, magnifies data by retrieving high-resolution illustrations and photomicrographs entrenched within images providing virtual enlargement of sections. A simulation link 235, identified by a computer icon, defines a connection of a mathematical simulation with equations, models, or textual description on which they are based.

A demonstration link 236, identified by a camera icon with patient, and an explanation link 237, identified by a camera with a professor, connects textual data with video clips that were installed by the audio/video module 80. The video clips, for example, can show actual subjects using neural prostheses and experts explaining implants, experimental procedures and pathology. Alternately, demonstration and explanation links lead to slide shows which include a series of images triggered by appropriate segments of an audio track that describe the images or animated pointers created by the animation module 150 to guide users through relevant features.

A remote access link 238, identified by a phone icon, defines a connection with a modem or network through the remote access module 140. The connection provides the user access to libraries and other data bases to retrieve scientific reports cited in or appearing after the peer review and release of the professor CITbook 40. A note link 239 indicates the presence of notes embedded within the text. Of course, many other types of links can be created to perform desired functions.

By assigning a series of links from one topic to another topic, readers and users are guided through selected materials in a predetermined order or primary sequence. This simulates, for example, navigating from chapter to chapter of a textbook. By assigning selected embedded links from one object to another, secondary paths or routes are generated in any direction through the vast collection of information contained in the professor CITbook 40 or student CITbook 50, thus creating multiple layers of accessible information. Material not connected to the primary sequence will not automatically be visited during a presentation. However, the material is accessible through manual activation of a secondary link connecting it to related material or to a search index. Many maps can be created, each one tailored for a specific audience, who might have a stronger background in certain disciplines than others. The link manager 230 provides easy custom organization and presentation of the material for the intended readers.

Figure 6G:
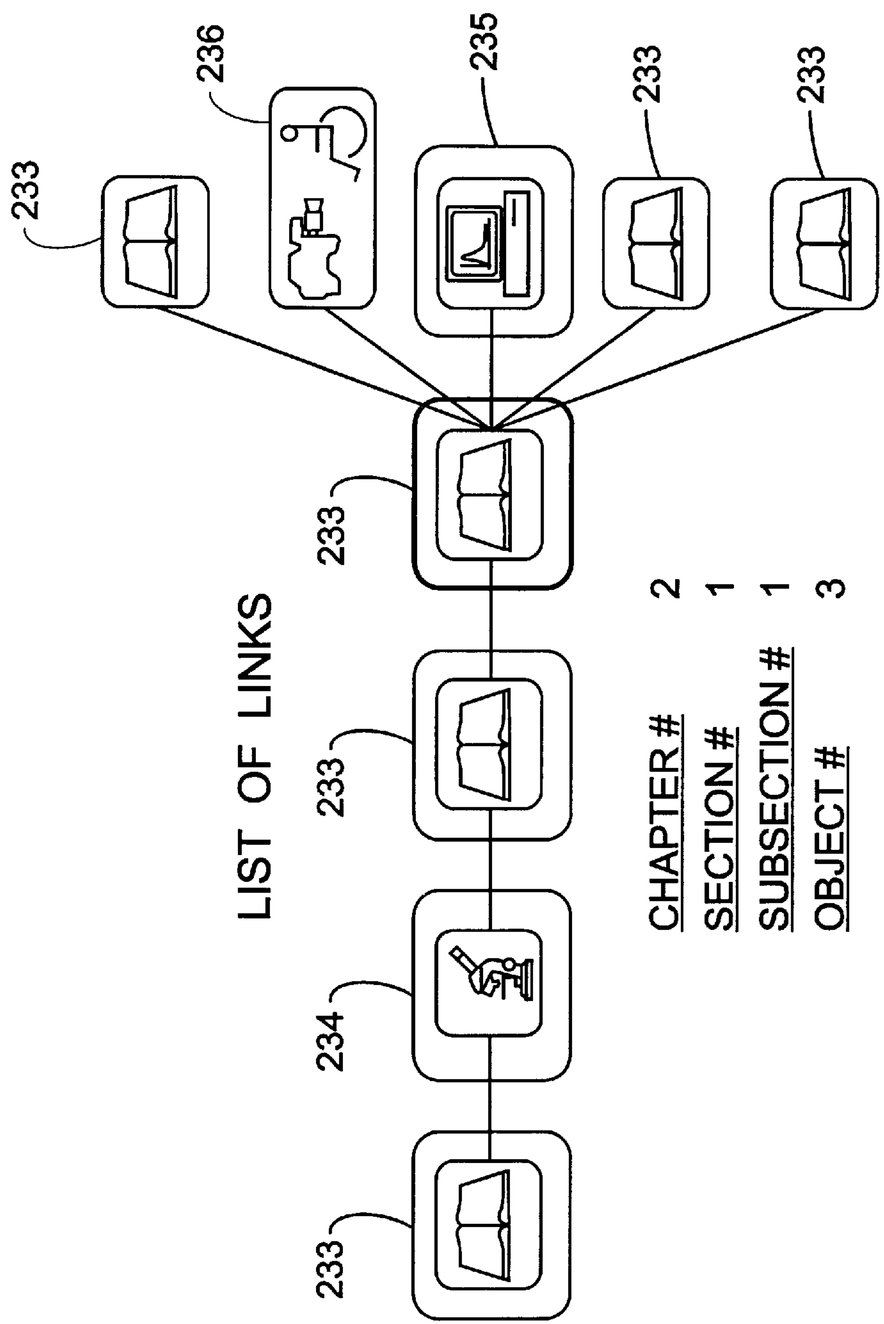
FIG. 6*g* illustrates a series of links connected and assigned to one another.

One can appreciate the number and volume of links and predefined sequences which exist in the customized interactive system. With further reference to FIG. **6*e* and FIG. 6*g*, in order to organize the links, the link manager 230 stores all predetermined sequences and links in a history and look-ahead-map 232 file which is accessible by a user. FIG. 6*g* illustrates an example of a history list of links that can be stored in the history and look-ahead-map 232**. With the map of links, the user can select a desired sequence to be executed during presentation of material or can select a specific point within a sequence from which the user wishes the presentation to begin. The map provides easy visualization of and navigation through topics that have been presented or that could be chosen for subsequent presentation from the current position in the material. Each link is stored with positional information such as chapter, section, subsection, and object for locating the link.

Figure 6H:
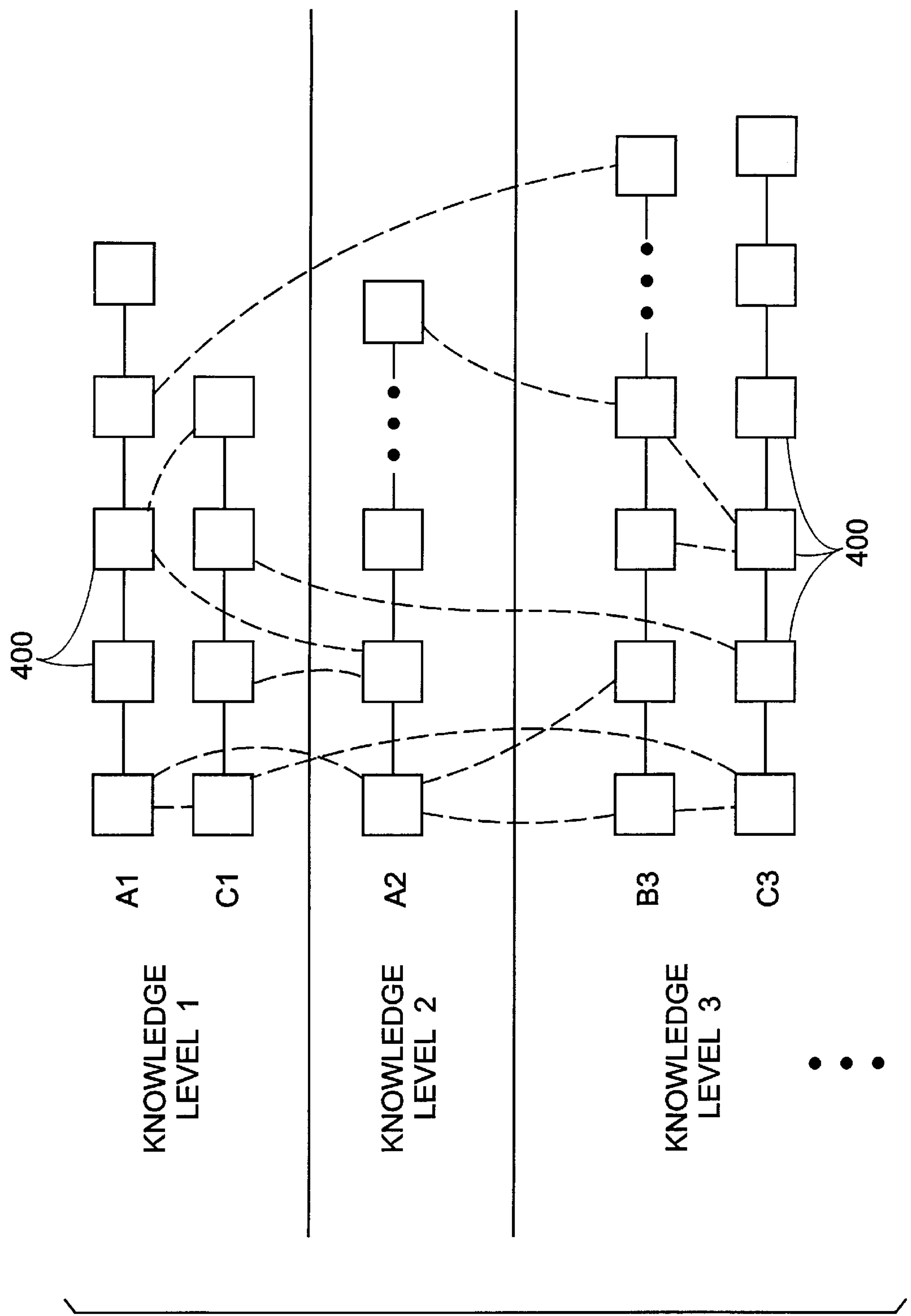
FIG. 6*h* is a graphical illustration showing an example of a plurality of subjects organized and categorized in sequence and by knowledge levels in accordance with the present invention.

FIG. 6*h* is a graphical illustration for exemplary purposes showing how material entered into the interactive system is categorized, stored and linked. In particular, different subjects A, B and C are separated as well as different knowledge levels of each subject. Topics 400, represented by a square, within subjects are then linked together to provide various access or presentation routes for the student while a subject is being presented. The presentation routes are shown as solid lines between topic 400. As shown in FIG. 6*h*, knowledge levels 1, 2, and 3 represent, for example, elementary level, high school level, and college level respectively. The letter "A" represents subject A and likewise, subjects B and C are shown. As shown in FIG. 6*h*, subject A includes material belonging in two different knowledge levels, namely, level 1 and level 2 as Al and A2. Subject B appears only at level 3 because level 1 and 2 topics of subject B were not inputting into the system or do not exist at lower knowledge levels.

As explained in the contribution manager section, each subject is organized into a plurality of chapters or topics 400 which are sequentially linked to one another. As a student selects a particular subject for presentation, the interactive system presents the material of the subject in the predetermined sequence. A lecture manager is provided to execute presentation sequences which is described below.

With further reference to FIG. 6*h*, the link manager 230 provides for the linking of one subject to another so that a student can cross-reference subjects. These links are shown as dashed lines connecting topics 400. Additionally, any selected topic 400 can be linked to another topic 400 of the same subject but having a different knowledge level to provide background or advanced data. For example, consider a student executing a presentation covering a graduate level electronics course. The student reaches an advanced topic discussing capacitors but the student does not fully understand the concepts involved in the capacitors. The student can activate a predefined link assigned to the capacitor topic which connects it to an elementary level capacitor topic. Upon selection of the link, the current presentation sequence is interrupted and the presentation resumes with a predetermined sequence associated with the elementary level capacitor topic. All changes in sequence are stored in the history and look-ahead-map 232. When the student is satisfied with the elementary discussion, he/she returns to the graduate level presentation. The system finds the return route using the history and look-ahead-map 232.

A topic of one subject can be linked with another indirectly related topic from a different subject. For example, a student executing a presentation of a college level magnetic field topic can activate a predefined link to retrieve information relating to stimulation of nerves. Of course, any desired link can be generated for a desired purpose. In this manner, a plurality of links are generated in a selected fashion to allow a student to easily access and cross-reference information between similar subjects, between different subjects, and between different knowledge levels.

Figure 6I:
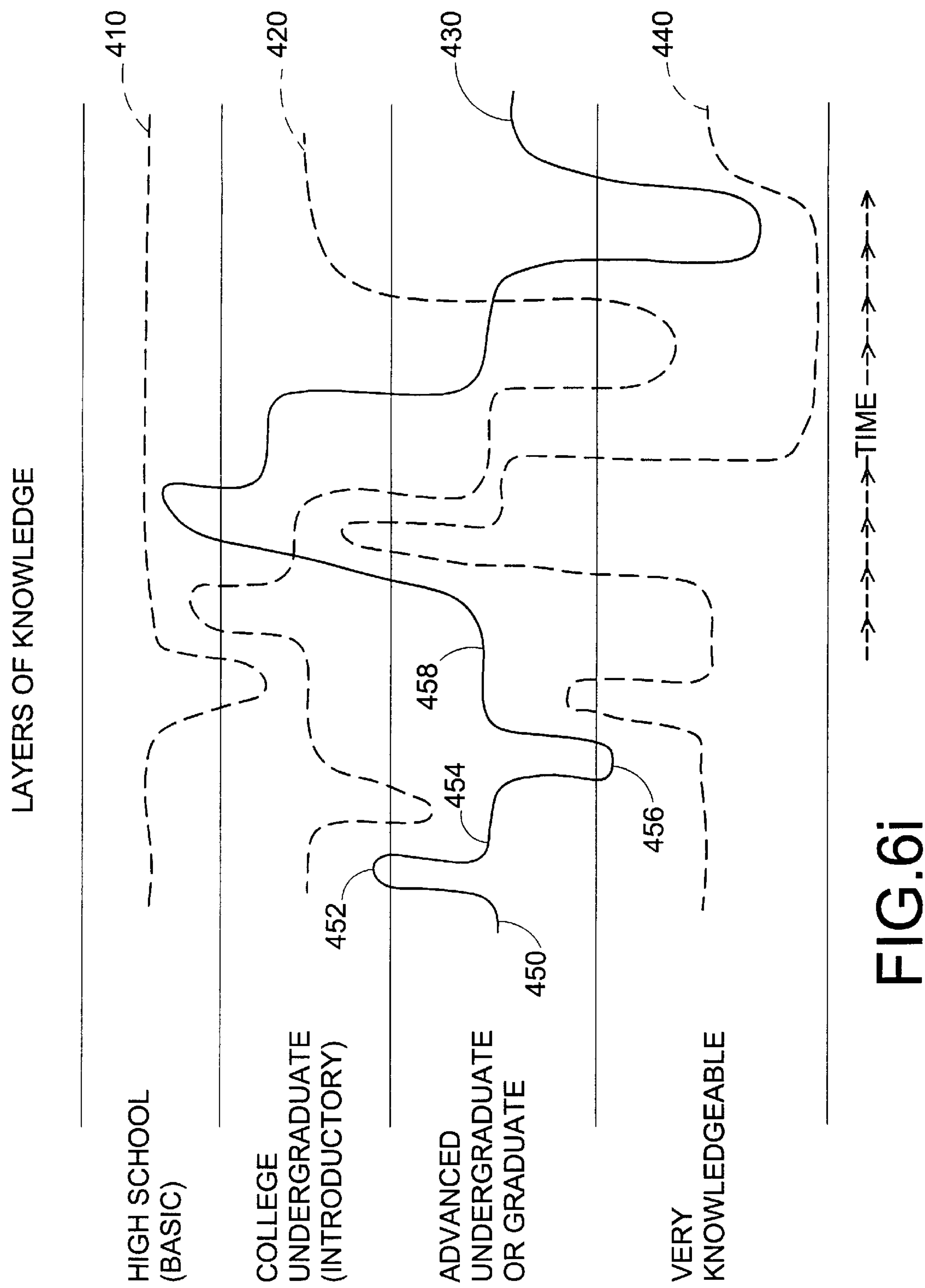
FIG. 6*i* illustrates four examples of presentation sequences which are dynamically changeable in accordance with the present invention.

With reference to FIG. 6*i*, a chart illustrating examples of dynamically changing presentations sequences is shown. As shown in FIG. 6*h*, each subject includes a group of topics which are linked in a predetermined sequence. When the subject is presented, it is presented in the predetermined sequence. However, the existence of embedded links along the predetermined sequence allows a student to dynamically change the presentation sequence.

With further reference to FIG. 6*i*, four presentation sequences 410, 420, 430, 440 are shown. Each sequence represents an exemplary sequence which may be taken by a student studying a subject belonging to a knowledge level. A student studying an advanced undergraduate or graduate level course begins the presentation sequence 430 at the graduate level as shown by point 450. As the presentation progresses, the student realizes that background information is needed and selects an embedded link which transports the presentation to a college undergraduate level 452. The presentation then returns to the graduate level at 454 until an advance topic link is selected which changes the presentation to a very knowledgeable level at 456 for a selected time until returning to the original presentation sequence at 458. In this manner, the student dynamically changes the predetermined presentation sequence to accommodate the student's level of comprehension or to pursue personal interests.

Lecture Manager

A lecture manager 240 operates with the presentation manager 250 for presenting material and controlling the sequence of the presentation. The lecture manager 240 assists in bringing the student CITbook material and format alive in a lecture or seminar setting, and, in doing so, greatly reduces time and effort requirements in preparing for presentations. In a preferred embodiment of the lecture manager 240, it includes sequencer routines functioning around the notion that lectures include a speaker following some outline of material while relying heavily on visual aids to emphasize and further explain what he or she is saying. Since the CITbook includes many visual and interactive functions, projecting the CITbook itself onto a classroom screen allows the material to be used for lectures as well as individual study.

Prior to presenting material, the lecture manager 240 operates with the link manager 230 allowing speakers to create outlines for lectures in the form of specialized maps and sequences through the material. This generates a desired order and sets a desired level of detail for a student CITbook 50 thereby customizing the preferred sequence generated for the professor CITbook 40. For example, a map determines what visual aids are included and whether the lecture presentation contains only key textual headings, with all the details to be supplied by the speaker, or whether it includes important thoughts from the text between the different headings. Then, in the classroom, the lecture manager 240 executes the sequence of the map to organize the student CITbook material and communicates the corresponding material to the presentation manager 250 for presentation. The executed map is the presentation sequence.

In another embodiment, the lecture manager 240 includes routines for transmitting time and material references using conventional cables connected to each computer running a student CITbook or via infrared signals throughout the lecture. As the lecture manager 240 sequences through a previously generated map, packets of information are transmitted containing the time of day and references to specific sections of text, images, simulations, or other objects. These packets are received and recorded by each student's terminal, laptop computer, or digital notepad which is being used to takes notes during the class and follow the presentation. Alternately as shown in FIG. 4, a video camera is connected for recording the classroom session for students absent from the presentation which also receives the time and reference stamps. The resulting time and material reference stamps in the notes or video assists in later coordinating questions, answers, discussions, drawings, notes, and demonstrations of the presentation with the actual student CITbook material.

Figure 6J:
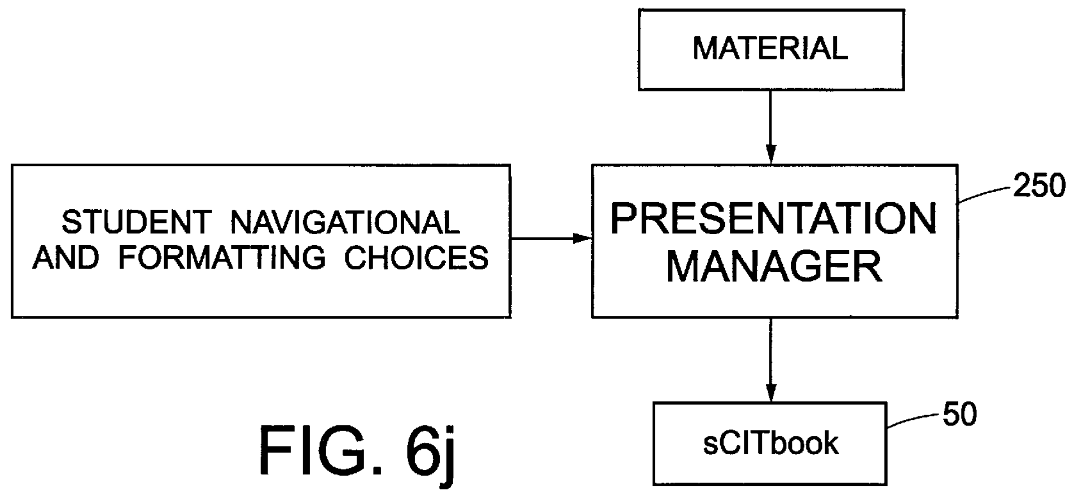
FIG. 6*j* illustrates a presentation manager in accordance with the present invention.

Presentation Manager With reference to FIG. 6*j*, the primary role of the presentation manager 250 is giving the CITbook presentation a look and feel of a traditional book which is easy to use. The presentation manager 250 includes hardware and software routines which function with the system processor providing computational speed and graphical display abilities to execute and present the multimedia data of a student CITbook 50 knowledge base. With this in mind, the presentation manager 250 includes a graphical user interface for arranging text in columns and displaying supporting materials adjacent to the text which they supplement. With reference to FIG. 6*d*, an exemplary presentation layout shows text and supporting material in a graphic that resembles a three-dimensional view of a book.

The presentation manager 250 further controls navigation of the material with functions for turning pages or flipping to a marked or tabbed sections like "Table of Contents," "Glossary," "Works Cited," "Figure," "Link," or "Summary of Illustrations." Preferably, each tabbed section is defined as an activatable object on the screen which a user can select. The presentation manager 250 further defines and displays functions which simulate traditional desktop tools which are controlled by the student contribution manager 220 such as tabs, bookmarks, "post-it"s and paper clips. These tools mark important locations within the material. Similar marking tools include pens and high-lighters for adding notes and emphasizing material. The traditional desktop tools are also defined as objects which can be selected by the user. The presentation manager 250 controls functional aspects of the traditional desktop tools and abilities, such as allowing the reader to click and drag a paper clip to a certain page, then keeping a record of material which has been marked.

Whereas a traditional text is virtually unchangeable with respect to the selection and organization of material once it is sent to a press for printing, the present invention is yielding to the changing needs of authors and students. In this regard, the presentation manager 250 monitors a selected or predetermined organizational path through the material. Based on the predetermined path, appropriate text and supplemental materials are retrieved from memory or storage and presented to the display screen at the appropriate times. The presentation manager 250 further controls dimensions, scaling, and borders of all presented material to ensure that they are acceptable for the user's screen size. User selected options are included to control whether certain media or objects are presented automatically or by selection. For example, a student using a computer having minimal processing power may select that memory or computationally intensive objects like video clips or simulations appear only by his or her choice instead of automatically.

In a preferred presentation format and with continued reference to FIG. 6*d*, the presentation manager 250 divides the student CITbook display 500 into two display columns with a text column 510 displayed on one side and all supporting materials on the other side 520. Providing the text column 510 of only text, with no interruptions by other objects and with the size, font and margins determined by the reader, allows fast reading and easy skimming of the text. Icons 530 are placed within the text to indicate where there is supporting materials available. Icons are displayed having a small size so that they are unobtrusive in scanning. The two display columns 510, 520 move together so that supporting materials remain adjacent to the indicating icons and the text which they supplement. Alternatively, one column is frozen while information is sought in the other column. For example, while viewing a model 540 under consideration on one side 520 of the display and its associated text on the text side 510, the user may wish to revisit background text that describes the foundation for the model 540. By selecting an option, the display of the model is maintained but the background text is retrieved and displayed in the text column 510 rather than the model's original text.

Pre-fetch Manager

Figure 6K:
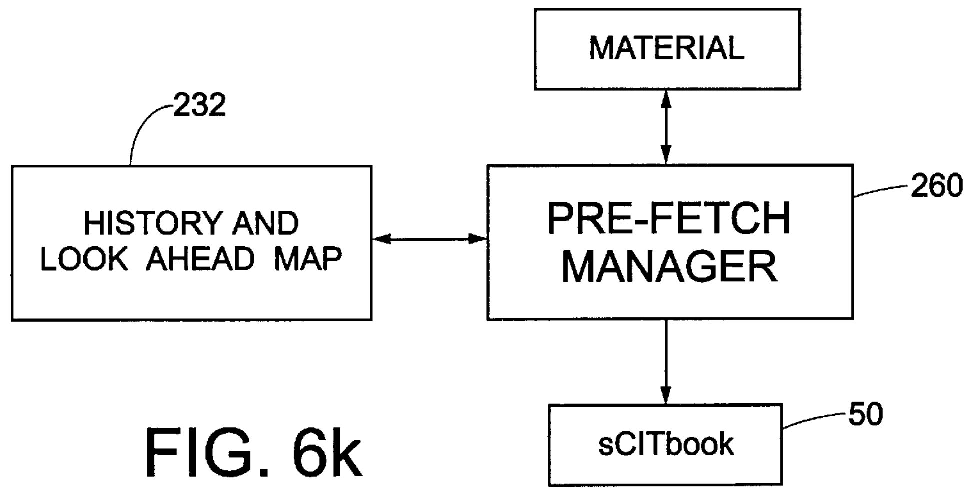
FIG. 6*k* illustrates a pre-fetch manager in accordance with the present invention.

With reference to FIG. 6*k*, a pre-fetch manager 260 maintains smooth and efficient operation of the student CITbook presentation by controlling the retrieval of material from storage media and storing the material in memory before its use is requested. Since the student CITbook 50 accommodates the changing needs of authors and students and does not require rigid selection and organization of material, the pre-fetch manager 260 anticipates what text, video/audio clips, images, simulations, illustrations, animations, or software for remote-access will be requested and presented next.

The most likely material for subsequent presentation is material which follows the current material in the predetermined presentation sequence according to the predefined links. Thus, the pre-fetch manager 260 monitors the current position within the presentation sequence map and loads into memory objects that are scheduled to be presented next. Other material that will likely be prepared for presentation, but with less priority, includes objects that have been recently presented. Storing these objects allows the user to regress a little before continuing. Alternate material which is pre-fetched is material which can be obtained from the current position by searching for relevant background or reference information. Preferably, the pre-fetch manager 260 prepares all objects and text that are one or less links removed from the current position in the presentation sequence.

Publication Manager

Figure 6L:
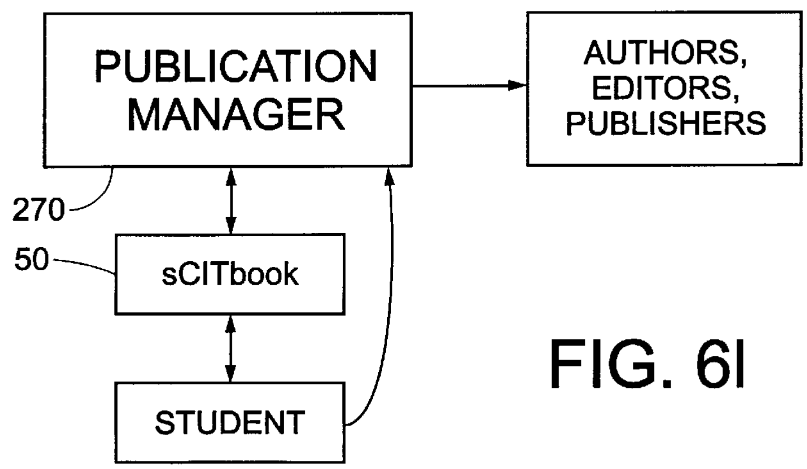
FIG. 6*l* illustrates a publication manager in accordance with the present invention.

With reference to FIG. 6*l*, a publication manager 270 electronically performs many of the publishing tasks associated with a traditional book, such as controlling access to and distribution of professor CITbooks 40, billing, and revenue. Since the CITbook complies with HyperText Markup Language (HTML) standards, it is accessible for use and distribution via the Internet and the World Wide Web. After establishing an account with the publication manager 270, a reader may log-in to access a current edition of the professor CITbook 40. The publication manager 270 monitors and records the reader's usage and bills his/her account accordingly. An Internet web site or other communications link allows institutions or companies to request delivery of the current edition of the professor CITbook 40 from the publication manager 270. As previously explained, resident experts using the professor CITbook 40 can create personalized versions which become a student CITbook 50. The student CITbook 50 can then be distributed over resident networks. The publication manager 270 and the distributed student CITbook 50 will then report, again via the Internet, to the base version of the publication manager 270 about new accounts and user activities.

In addition to tracking the amount of time for which particular users access their student CITbook 50, the publication manager 270 records specifically which chapters, sections and subsections and which simulations, audio/video clips, and other objects within them were accessed. One reason for tracking usage of the CITbook so closely is to establish the frequency of use of the different objects that supplement text as a measure of their benefit to the educational experience. Furthermore, the monitoring can be used for justifying the time and expense of creating and inserting similar objects in newer, revised versions of the material. Another reason is for distribution of collected revenue back to expert contributors whose material is used in the professor CITbook 40. Finally, the publication manager 270 uses the log of modifications 182 created by the modification manager 180 to track modifications made by expert contributors as an indication of what portions of the material might have been found questionable or lacking and as an aid in considering an expert's changes for inclusion into a new release of the professor CITbook 40.

Gaming Module

Along any sequence, the professor may insert questions relating to the corresponding topics which test the student's comprehension of the subject matter. With reference to FIG. 5, a gaming module 280, or gamer, is interconnected with the lecture manager 240 and presentation manager 250 which is activated once a question appears in the presented text. The gamer 280 interrupts the presentation sequence and requests that the student input an answer. The inputted answer is then compared to a correct answer stored by the gamer 280. A message is then generated and presented to the student indicating whether the answer was correct.

The gamer 280 keeps track of correct and incorrect answers. When a specified number of questions are answered incorrectly, the gamer 280 interrupts the sequencer and forces the sequence back to a position where the topic is repeated to the student for further comprehension. Through forced repetition, the likelihood of comprehension greatly increases. Alternately, the gamer 280 may include artificial intelligence routines including a set of knowledge and object rules which track and monitor the student's responses to questions. Based on the responses, the gamer 280 determines the student's level of comprehension and selects an appropriate point in the sequence to which the student must relearn the material not yet comprehended. The gamer 280 may organize questions according to subject matter, topic and difficulty level which aids the gamer in determining the appropriate point in the sequence to which the student must return to.

In summary, the present invention provides students increased interaction with the material via a multimedia presentation. The interactive textbook is a clearer, more effective education medium than any previously published text. The interactive textbook's information and tools encourage student users to pose and answer questions, something that is not possible when reading a conventional book. The users can proceed at their own pace, which is usually impossible in a seminar or lecture hall, and they will benefit from a more hands-on approach than either a book or lecture permits. The CITbook replaces, or at least supplements, many routine aspects of lecturing, thus reshaping the roles of professors and other experts as researchers, educators and mentors by providing them with more time to further knowledge, relate valuable experience, lead discussion, provoke thoughts and test for synthesis of material.

The rich knowledge base of any educational institution is only available to students enrolled at the institution, to the limited audiences attending special lectures given by the faculty and to small groups with whom the institution consults. The present invention opens the possibility for many additional students and audiences to have access to the rich knowledge base and expertise. The unique strength of Case Western Reserve University in bioelectric engineering of the nervous system, and the limited access that the larger community has to our information base, exemplifies a major problem facing education in most institutions of higher learning, particularly those teaching biomedical engineering. The present invention provides access to unique knowledge bases for a broader consumer base. The present invention opens the knowledge we have acquired to an audience far broader than our current audience. Furthermore, and that other institutions, with uniquely well-developed bases of knowledge, can use the CITbook for increasing access to their knowledge base and expanding their audience.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for an educator to teach a subject to a student, said method including:

supplying a primary knowledge base to an educator, said primary knowledge base including data relating to the subject to be taught as compiled by at least one expert;

generating a secondary knowledge base that is a subset of said primary knowledge base data, said secondary knowledge base including only portions of said primary knowledge base selected by said educator;

customizing the secondary knowledge base to obtain a customized secondary knowledge base by adding customizing subject data to the secondary knowledge base as said customizing subject data are input by an educator, the additional customizing subject data being data that are related to the subject to be taught to the student;

distinguishing the added customizing subject data input by said educator from the selected primary knowledge base data supplied to the educator in the customized secondary knowledge base; and using a computer to present the customized secondary knowledge base to the student in a predetermined sequence and visually distinguishing the additional customizing subject data from the primary knowledge base data such that the primary knowledge data and the customizing subject data defining the customized secondary knowledge base are identifiable and distinguishable by the student being taught by the educator.

2. The method of teaching as set forth in claim 1 further comprising, before the step of supplying the primary knowledge base:

collecting primary information relating to the subject, said collected primary information being proven and well-accepted by experts knowledgeable in the subject; and generating the primary knowledge base by selecting data for the primary knowledge base from the primary information collected.

3. The method of teaching as set forth in claim 1 further including:

periodically dynamically updating the primary knowledge base with current data; and distributing the updated primary knowledge base to the educator, whereby said educator can use said updated primary knowledge base to generate an updated secondary knowledge base and an updated customized secondary knowledge base.

4. The method of teaching as set forth in claim 1 wherein the step of customizing the secondary knowledge base includes adding new data, modifying portions of the selected primary knowledge base data, and deleting portions of the selected primary knowledge base data.

5. The method of teaching as set forth in claim 4 further including storing a history of customizations to the secondary knowledge base such that a previous version of the customized secondary knowledge base is generable.

6. The method of teaching as set forth in claim 1 further including modifying the predetermined sequence in which the customized secondary knowledge base is presented to the student in accordance with input by the educator prior to presenting the customized secondary knowledge base to the student.

7. The method of teaching as set forth in claim 1 further including dynamically changing the predetermined sequence in which the customized secondary knowledge base is presented to the student in accordance with input by the student during the presentation of the customized secondary knowledge base such that selected portions of the customized secondary knowledge base are presented to the student in accordance with a secondary sequence different from said predetermined sequence.

8. An apparatus adapted for use by an educator to teach a subject to a student, said apparatus comprising:

means for receiving a primary knowledge base defined by well-accepted expert data relating to the subject that is to be taught to the student by the educator;

means for generating a secondary knowledge base defined by select portions of the primary knowledge base data, said means for generating said secondary knowledge base adapted for accepting input from said educator as to the portions of the primary knowledge base data to be included in the secondary knowledge base;

means for customizing the secondary knowledge base to provide a customized secondary knowledge base by combining additional customizing subject data input by an educator with the selected primary knowledge base data, the additional customizing subject data being data that are related to the subject to be taught to the student;

means for distinguishing the additional customizing subject data from the selected primary knowledge base data in the customized secondary knowledge base; and means for presenting the customized secondary knowledge base to the student in a predetermined sequence and visually distinguishing the additional customizing subject data from the selected primary knowledge base data in the customized secondary knowledge base.

9. The apparatus as set forth in claim 8 further including means for altering the predetermined sequence in which the customized secondary knowledge base is presented to the student.

10. The apparatus as set forth in claim 8 further including a gaming mode means for selectively interrupting the predetermined sequence and presenting questions to the student, said gaming mode means adapted for continuing said predetermined sequence in response to said student correctly answering a presented question, and adapted for repeating a portion of the predetermined sequence in response to said student incorrectly answering a predetermined number of the presented questions.

11. The apparatus as set forth in claim 10 wherein the gaming mode means comprises:

an inference engine operating according to a predetermined set of knowledge rules, said inference engine adapted for monitoring the answers of the student to the presented questions and determining a level of comprehension of the student, wherein said inference engine signals the means for presenting to modify the predetermined sequence in accordance with the level of comprehension determined for the student.

12. The apparatus as set forth in claim 8 further comprising:

a link manager adapted for storing and modifying a plurality of sequence links, each sequence link defining a learning sequence that connects a selected group of topics from the customized secondary knowledge base in a desired sequence, the learning sequence being executable by the presentation means as the predetermined sequence such that information from topics included in the learning sequence are retrieved and presented to the student in an order defined by the learning sequence.

13. An interactive teaching apparatus adapted for educating a student with data related to a plurality of subjects and based upon input by said student, said apparatus comprising:

a processor and a memory unit for organizing data from the plurality of subjects to be taught and for presenting data from the plurality of subjects to the student;

contribution means for educator input of additional data into the interactive apparatus and for educator modification of subject data in the interactive apparatus, the educator-input data corresponding to one of the plurality of subjects to be taught to the student;

data manager means for: (i) categorizing the educator-input data into a selected subject of the plurality of subjects; and, (ii) determining a knowledge level from a plurality of different knowledge levels of the selected subject based upon the difficulty of the educator-input data, said knowledge levels comprising one of elementary level, high school level, college level, graduate level, and expert level, the data manager means organizing the categorized data into a plurality of chapters and connecting each chapter in a selected sequence based on the knowledge level of the selected subject;

interaction means for receiving data from the student and allowing the student to select a subject from the plurality of subjects to be presented to the student;

presentation means for presenting the selected subject to the student in a predetermined sequence;

subject connector means for selectively connecting the selected subject at a plurality of first connector points along the predetermined sequence to at least one different subject at a plurality of second connector points, the plurality of first connector points being presented to the student by the presentation means along with corresponding portions of the selected subject such that when one of the plurality of first connector points is selected by the student, the subject connector means interrupts the execution of the predetermined sequence and the presentation means presents the different subject beginning at the second connector point which is connected to the selected one of the plurality of first connector points; and level connector means for selectively connecting the selected subject to a different knowledge level from the plurality of knowledge levels, the level connector means generating a level connector point along the predetermined sequence and connecting the level connector point to a destination level connector point within the different knowledge level, the level connector point being selectable by the student through the presentation means such that when the level connector point is selected by the student, the level connector means interrupts the predetermined sequence and the presentation means presents the selected subject at the different knowledge level connected to the destination level connector point.

14. The interactive teaching apparatus as set forth in claim 13 further including note means for receiving notes from the student at a current page in the predetermined sequence during the presentation, the note means storing and associating the notes received with the selected subject at the current page in the predetermined sequence such that when the current page of the selected subject is subsequently presented, the presentation means presenting the notes received.

15. The interactive teaching apparatus as set forth in claim 13 wherein the level connector means generates a plurality of student-selectable level connector points along the predetermined sequence and connects each of the plurality of the level connector points to a destination level connector point within a selected knowledge level from the plurality of knowledge levels.

16. A method of teaching a course to a student comprising:

generating a primary database including a plurality of subjects each having a knowledge level selected from a plurality of knowledge levels, the plurality of knowledge levels based upon difficulty and including elementary level, high school level, college level, graduate level and expert level, each subject including a plurality of topics formed from multimedia data including text, audio, video, illustration, simulation and animation;

generating a secondary database including a first set of subjects and topics selected from the plurality of subjects and topics of the primary database in accordance with the course to be taught to the student and based upon selections input by an educator responsible for teaching the student;

defining a primary link sequence interconnecting the first set of subjects and topics in accordance with a preferred presentation sequence for the course based upon input by said educator;

defining, based upon input by said educator, a plurality of secondary link sequences each different than the primary link sequence and connecting the first set of subjects and topics to each other, the plurality of secondary link sequences being activatable by the student; and using a computer to present the selected subjects and topics to the student in a presentation sequence according to the primary link sequence; and, dynamically changing the presentation sequence in which the selected subjects are presented to the student based upon the student activating a selected one of the plurality of secondary link sequences.

17. The method of teaching as set forth in claim 16 wherein the defining the plurality of secondary link sequences includes defining a knowledge link connecting a first topic having a first knowledge level to the first topic having a second knowledge level different from the first knowledge level, such that when the first topic is presented at the first knowledge level and the knowledge link is selected, the first topic is presented to the student at the second knowledge level.

18. The method of teaching as set forth in claim 16 further including customizing the secondary database including adding material and altering existing material in accordance such that a customized secondary database is generated.

* * * * *